US012588067B2

(12) United States Patent
Christoffersson et al.

(10) Patent No.: US 12,588,067 B2
(45) Date of Patent: Mar. 24, 2026

(54) RANDOM ACCESS IN A WIRELESS COMMUNICATION NETWORK

(71) Applicant: Telefonaktiebolaget LM Ericsson (publ), Stockholm (SE)

(72) Inventors: Jan Christoffersson, Luleå (SE); Min Wang, Luleå (SE); Mårten Ericson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 18/026,384

(22) PCT Filed: Sep. 15, 2020

(86) PCT No.: PCT/EP2020/075709
§ 371 (c)(1),
(2) Date: Mar. 15, 2023

(87) PCT Pub. No.: WO2022/057997
PCT Pub. Date: Mar. 24, 2022

(65) Prior Publication Data
US 2023/0389080 A1 Nov. 30, 2023

(51) Int. Cl.
*H04W 74/08* (2024.01)
*H04W 74/0833* (2024.01)
(Continued)

(52) U.S. Cl.
CPC .... *H04W 74/0833* (2013.01); *H04W 74/0836* (2024.01); *H04W 74/0838* (2024.01)

(58) Field of Classification Search
CPC ......... H04W 74/0833; H04W 74/0836; H04W 74/0838; H04B 7/06952; H04L 5/0048; H04L 5/0053; H04L 5/0094
See application file for complete search history.

(56) References Cited

U.S. PATENT DOCUMENTS

| | | | | |
|---|---|---|---|---|
| 11,375,527 | B1 * | 6/2022 | Eyuboglu | .......... H04B 7/15528 |
| 2019/0110314 | A1 * | 4/2019 | Abedini | ................ H04L 5/0078 |

(Continued)

FOREIGN PATENT DOCUMENTS

| | | | | |
|---|---|---|---|---|
| WO | WO-2021186046 A1 * | 9/2021 | ........ H04W 52/0219 |
| WO | 2022033658 A1 | 2/2022 | |

OTHER PUBLICATIONS

3GPP, "3GPP TS 38.321 V16.1.0", 3rd Generation Partnership Project; Technical Specification Group Radio Access Network; NR; Radio Resource Control (RRC) protocol specification (Release 16), Jul. 2020, 1-151.

(Continued)

*Primary Examiner* — Lan-Huong Truong
(74) *Attorney, Agent, or Firm* — Murphy, Bilak & Homiller, PLLC

(57) ABSTRACT

A wireless communication device (12) receives a random access configuration (18) from a radio network node (14) configured to transmit multiple SSBs (16-1 . . . 16-N). The random access configuration (18) configures the wireless communication device (12) with a set (20) of one or more random access preambles. This set (20) of one or more random access preambles is not associated with any of the multiple SSBS (16-1 . . . 16-N). Upon receiving a random access preamble from this set, the radio network node (14) may transmit a random access response as a response to the random access preamble. The radio network node (14) may do so by transmitting the random access response on one or more downlink beams that are estimated from measurement of an uplink beam or uplink signal from the wireless communication device (12).

17 Claims, 23 Drawing Sheets

(51) Int. Cl.
    *H04W 74/0836*     (2024.01)
    *H04W 74/0838*     (2024.01)

(56)           References Cited

U.S. PATENT DOCUMENTS

2020/0314917 A1*   10/2020   Jeon ...................... H04W 74/08
2021/0227418 A1*   7/2021   Hwang ................. H04L 5/0057

OTHER PUBLICATIONS

3GPP, "3GPP TS 38.213 V16.2.0", 3rd Generation Partnership Project; Technical Specification Group Radio Access Network; NR; Physical layer procedures for control (Release 16), Jun. 2020, 1-176.

3Gpp, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.8.0, Dec. 2019, 1-365.

3GPP, "3rd Generation Partnership Project; Technical Specification Group Radio Access Network; NR; Physical channels and modulation (Release 16)", 3GPP TS 38.211 V16.2.0, Jun. 2020, 1-131.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, 1-906.

Dahlman, Erik, et al., "4G LTE-Advanced Pro and The Road to 5G", Third edition, Chapter 14 Access Procedures, 2016, 1 page.

Ericsson, "Procedure for Two-step RACH", 3GPP TSG-RAN WG1 Meeting #98, R1-1910907, Chongqing, China, Oct. 14-18, 2019, 1-21.

Huawei, "RACH Configuration for Msg1 based On-Demand SI Request", 3GPP TSG-RAN2 Meeting #101, R2-1803368, Athens, Greece, Feb. 26-Mar. 2, 2018, 1-5.

ZTE Corporation, et al., "New work item: 2-step RACH for NR", 3GPP TSG RAN Meeting #82, RP-182894, Sorrento, Italy, Dec. 10-13, 2018, 1-5.

\* cited by examiner

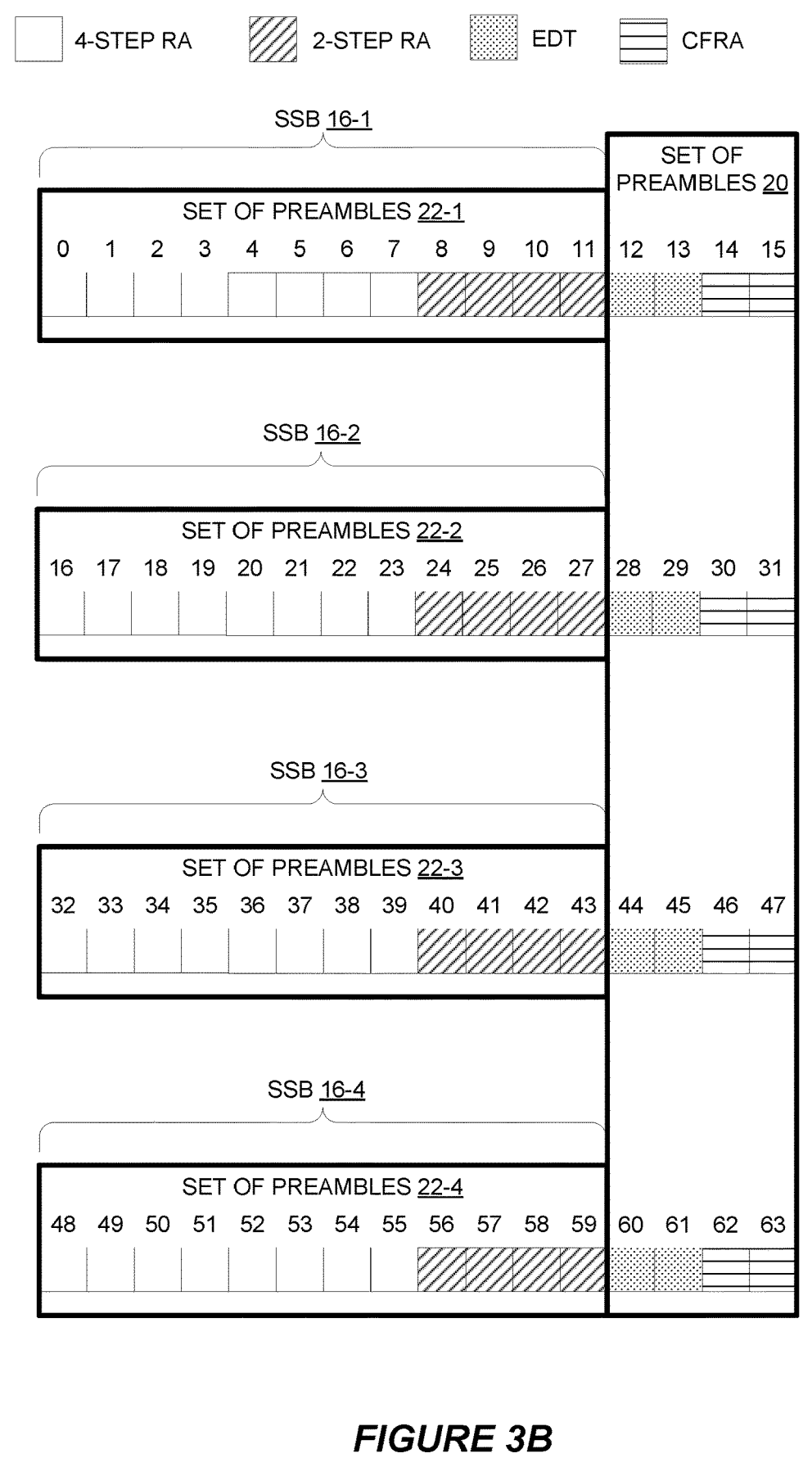

☐ 4-STEP RA    ▨ 2-STEP RA    ▨ EDT    ▤ CFRA

SSB 16-1

SET OF PREAMBLES 20

SET OF PREAMBLES 22-1

| 0 | 1 | 2 | 3 | 4 | 5 | 6 | 7 | 8 | 9 | 10 | 11 | 12 | 13 | 14 | 15 |

SSB 16-2

SET OF PREAMBLES 22-2

| 16 | 17 | 18 | 19 | 20 | 21 | 22 | 23 | 24 | 25 | 26 | 27 | 28 | 29 | 30 | 31 |

SSB 16-3

SET OF PREAMBLES 22-3

| 32 | 33 | 34 | 35 | 36 | 37 | 38 | 39 | 40 | 41 | 42 | 43 | 44 | 45 | 46 | 47 |

SSB 16-4

SET OF PREAMBLES 22-4

| 48 | 49 | 50 | 51 | 52 | 53 | 54 | 55 | 56 | 57 | 58 | 59 | 60 | 61 | 62 | 63 |

*FIGURE 3B*

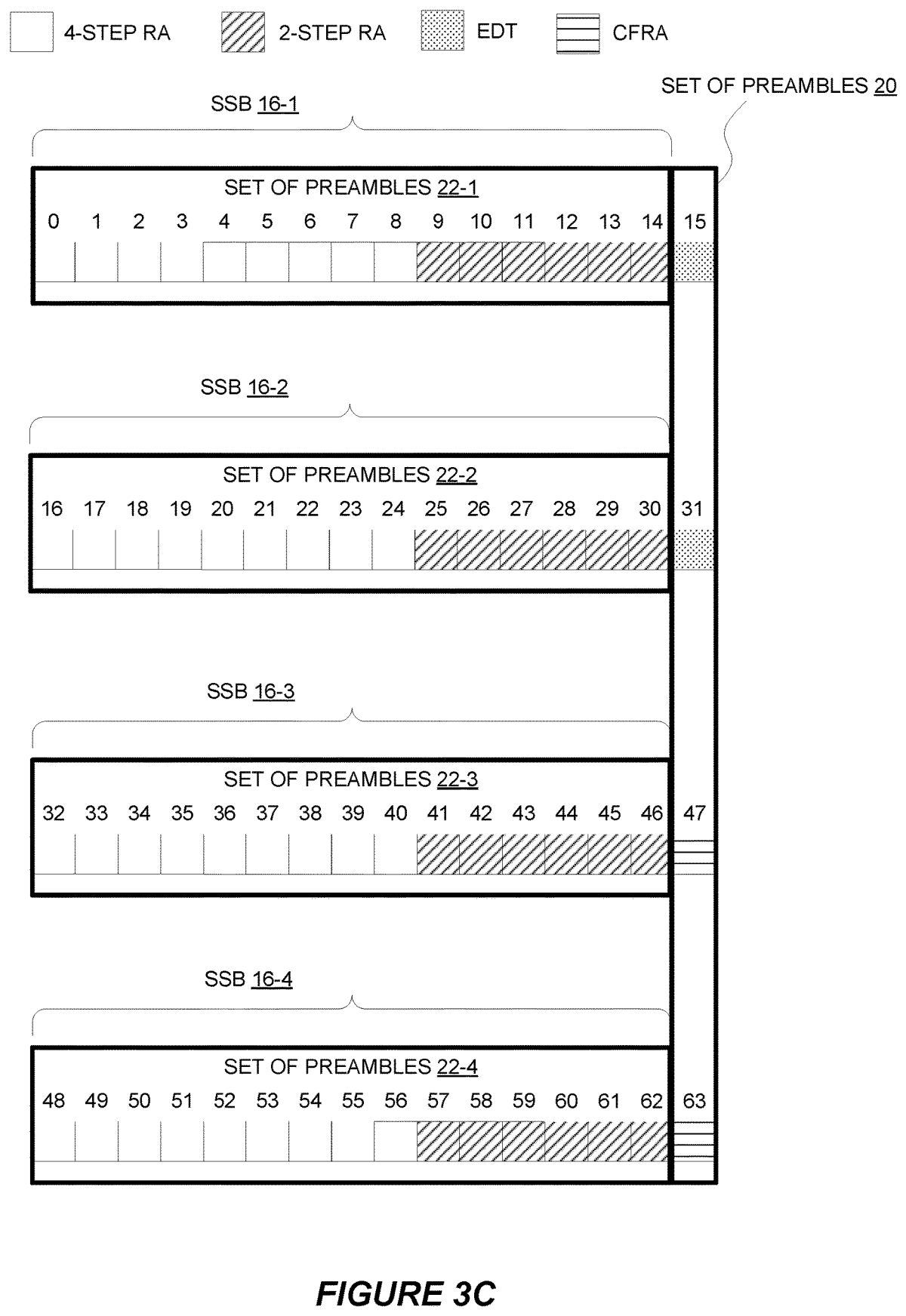

☐ 4-STEP RA    ▨ 2-STEP RA    ▦ EDT    ▤ CFRA

SET OF PREAMBLES 20

SSB 16-1

SET OF PREAMBLES 22-1

| 0 | 1 | 2 | 3 | 4 | 5 | 6 | 7 | 8 | 9 | 10 | 11 | 12 | 13 | 14 | 15 |

SSB 16-2

SET OF PREAMBLES 22-2

| 16 | 17 | 18 | 19 | 20 | 21 | 22 | 23 | 24 | 25 | 26 | 27 | 28 | 29 | 30 | 31 |

SSB 16-3

SET OF PREAMBLES 22-3

| 32 | 33 | 34 | 35 | 36 | 37 | 38 | 39 | 40 | 41 | 42 | 43 | 44 | 45 | 46 | 47 |

SSB 16-4

SET OF PREAMBLES 22-4

| 48 | 49 | 50 | 51 | 52 | 53 | 54 | 55 | 56 | 57 | 58 | 59 | 60 | 61 | 62 | 63 |

*FIGURE 3C*

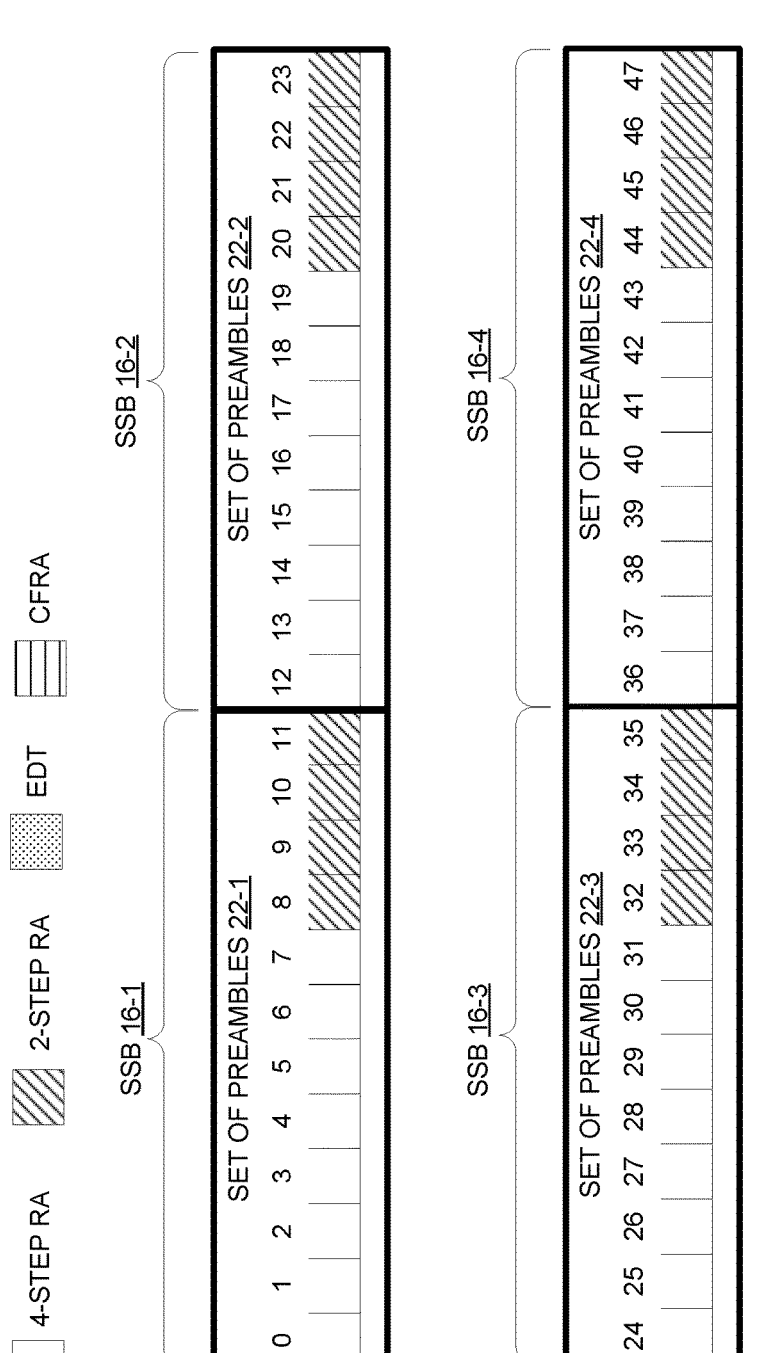
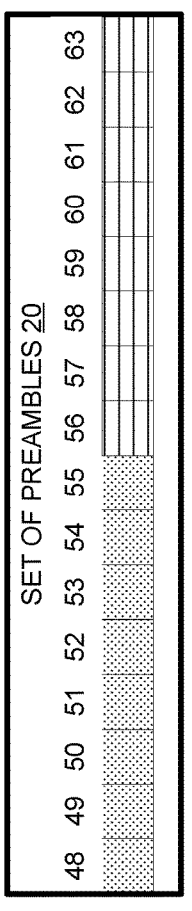
*FIGURE 3D*

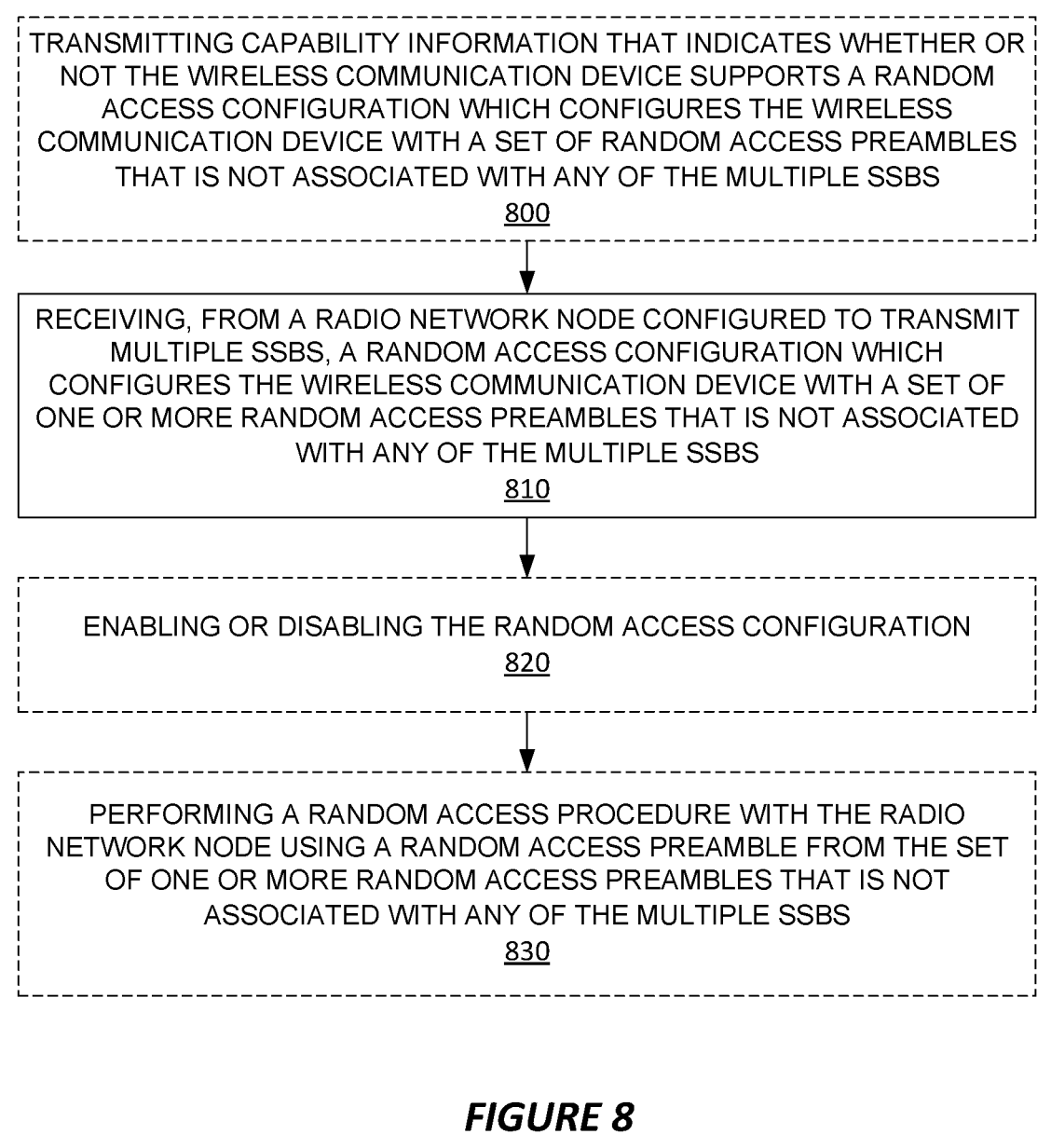

TRANSMITTING CAPABILITY INFORMATION THAT INDICATES WHETHER OR NOT THE WIRELESS COMMUNICATION DEVICE SUPPORTS A RANDOM ACCESS CONFIGURATION WHICH CONFIGURES THE WIRELESS COMMUNICATION DEVICE WITH A SET OF RANDOM ACCESS PREAMBLES THAT IS NOT ASSOCIATED WITH ANY OF THE MULTIPLE SSBS
800

RECEIVING, FROM A RADIO NETWORK NODE CONFIGURED TO TRANSMIT MULTIPLE SSBS, A RANDOM ACCESS CONFIGURATION WHICH CONFIGURES THE WIRELESS COMMUNICATION DEVICE WITH A SET OF ONE OR MORE RANDOM ACCESS PREAMBLES THAT IS NOT ASSOCIATED WITH ANY OF THE MULTIPLE SSBS
810

ENABLING OR DISABLING THE RANDOM ACCESS CONFIGURATION
820

PERFORMING A RANDOM ACCESS PROCEDURE WITH THE RADIO NETWORK NODE USING A RANDOM ACCESS PREAMBLE FROM THE SET OF ONE OR MORE RANDOM ACCESS PREAMBLES THAT IS NOT ASSOCIATED WITH ANY OF THE MULTIPLE SSBS
830

*FIGURE 8*

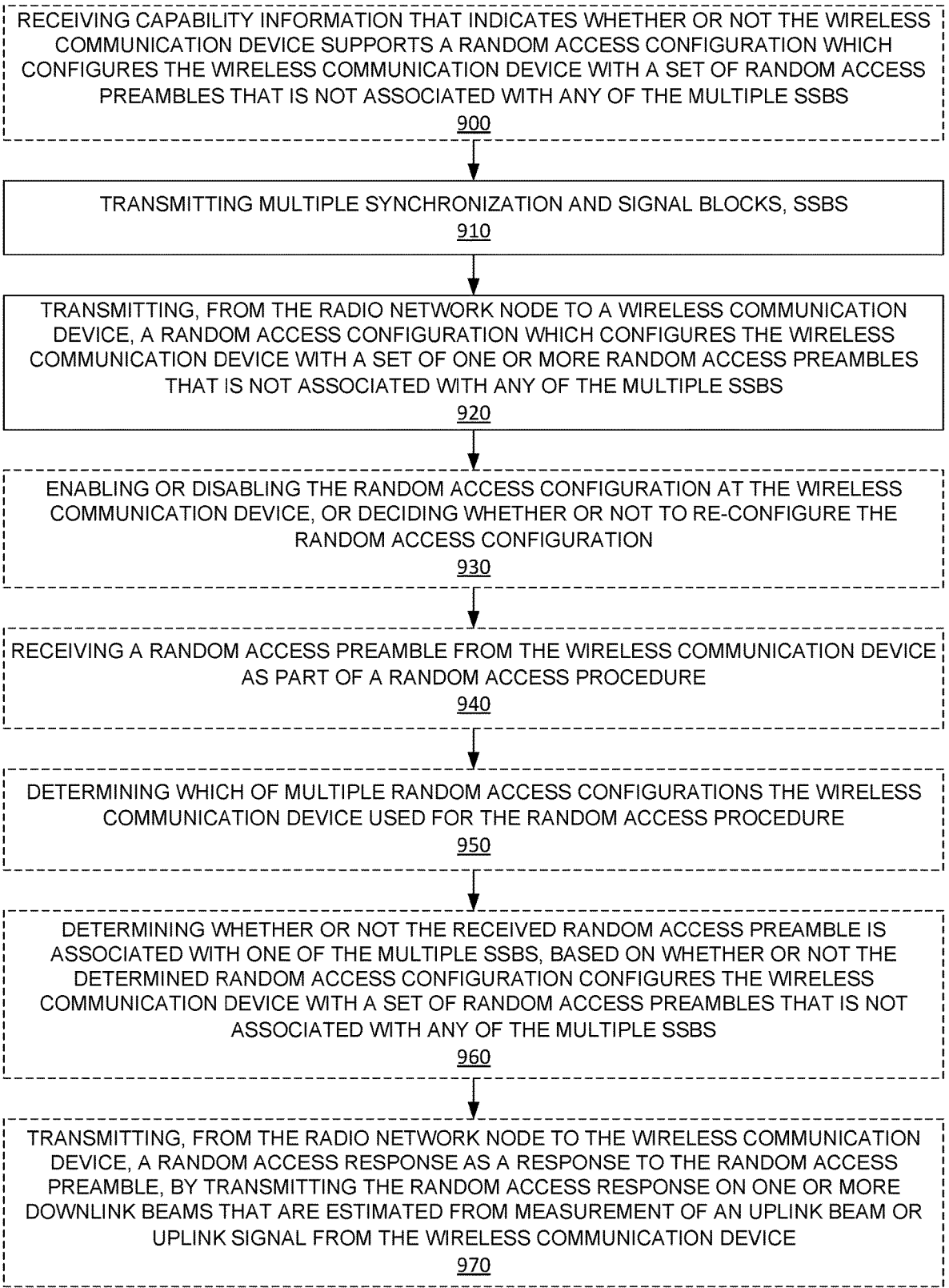

RECEIVING CAPABILITY INFORMATION THAT INDICATES WHETHER OR NOT THE WIRELESS COMMUNICATION DEVICE SUPPORTS A RANDOM ACCESS CONFIGURATION WHICH CONFIGURES THE WIRELESS COMMUNICATION DEVICE WITH A SET OF RANDOM ACCESS PREAMBLES THAT IS NOT ASSOCIATED WITH ANY OF THE MULTIPLE SSBS
900

TRANSMITTING MULTIPLE SYNCHRONIZATION AND SIGNAL BLOCKS, SSBS
910

TRANSMITTING, FROM THE RADIO NETWORK NODE TO A WIRELESS COMMUNICATION DEVICE, A RANDOM ACCESS CONFIGURATION WHICH CONFIGURES THE WIRELESS COMMUNICATION DEVICE WITH A SET OF ONE OR MORE RANDOM ACCESS PREAMBLES THAT IS NOT ASSOCIATED WITH ANY OF THE MULTIPLE SSBS
920

ENABLING OR DISABLING THE RANDOM ACCESS CONFIGURATION AT THE WIRELESS COMMUNICATION DEVICE, OR DECIDING WHETHER OR NOT TO RE-CONFIGURE THE RANDOM ACCESS CONFIGURATION
930

RECEIVING A RANDOM ACCESS PREAMBLE FROM THE WIRELESS COMMUNICATION DEVICE AS PART OF A RANDOM ACCESS PROCEDURE
940

DETERMINING WHICH OF MULTIPLE RANDOM ACCESS CONFIGURATIONS THE WIRELESS COMMUNICATION DEVICE USED FOR THE RANDOM ACCESS PROCEDURE
950

DETERMINING WHETHER OR NOT THE RECEIVED RANDOM ACCESS PREAMBLE IS ASSOCIATED WITH ONE OF THE MULTIPLE SSBS, BASED ON WHETHER OR NOT THE DETERMINED RANDOM ACCESS CONFIGURATION CONFIGURES THE WIRELESS COMMUNICATION DEVICE WITH A SET OF RANDOM ACCESS PREAMBLES THAT IS NOT ASSOCIATED WITH ANY OF THE MULTIPLE SSBS
960

TRANSMITTING, FROM THE RADIO NETWORK NODE TO THE WIRELESS COMMUNICATION DEVICE, A RANDOM ACCESS RESPONSE AS A RESPONSE TO THE RANDOM ACCESS PREAMBLE, BY TRANSMITTING THE RANDOM ACCESS RESPONSE ON ONE OR MORE DOWNLINK BEAMS THAT ARE ESTIMATED FROM MEASUREMENT OF AN UPLINK BEAM OR UPLINK SIGNAL FROM THE WIRELESS COMMUNICATION DEVICE
970

FIGURE 9

RANDOM ACCESS IN A WIRELESS COMMUNICATION NETWORK

TECHNICAL FIELD

The present application relates generally to a wireless communication network and relates more particularly to random access in such a wireless communication network.

BACKGROUND

In order to improve the received-signal quality at a wireless communication device, a radio network node uses beamforming to concentrate the energy of the transmitted signal in a certain direction towards that wireless communication device. The radio network node may for example transmit a signal on a certain downlink beam that focuses the transmitted signal's energy in that certain direction.

To exploit beamforming for a particular wireless communication device, the radio network node needs to first identify in which direction the wireless communication device lies with respect to the radio network node's antenna array. One way for the radio network node to do this is for the radio network node to transmit different signals on different respective downlink beams, so that the wireless communication device can report back which signal (and thereby which downlink beam) was received with the best quality. The radio network node then uses the downlink beam associated with the reported signal for subsequent transmission to the wireless communication device.

Known approaches incorporate this reporting process into random access. Different sets of random access preambles are mapped to different synchronization signal blocks (SSBs), e.g., with different subsets of preambles within any given set mapped to different situations such as 4-step random access, 2-step random access, early data transmission (EDT), and contention-free random access (CFRA). A radio network node transmits the different SSBs on different respective downlink beams. A wireless communication device implicitly reports back which SSB was received with the best quality by transmitting a random access preamble that is included in the set of preambles mapped to that SSB. The radio network node then uses whichever downlink beam is mapped to the reported SSB for subsequent transmission to the wireless communication device.

However, these known approaches to preferred SSB reporting do not scale well as the number of SSBs and associated downlink beams increases. As the number of SSBs increases, the number of preambles mapped to each SSB decreases. Decreasing the number of preambles mapped to each SSB threatens to likewise decrease the number of preambles mappable to different situations. For example, increasing the number of SSBs from 2 to 4 may decrease the number of preambles mapped to each SSB from 32 to 16, and decrease the number of preambles mapped to early data transmission (EDT) from 4 to 2. With fewer preambles for wireless communication devices to select from in such a situation, there is a greater chance of preamble collision and thereby random access failure. One way to avoid this would be to effectively multiplex SSBs across different occasions in time in which random access preambles are transmittable, i.e., map different random access occasions to different sets of SSBs. However, this would come at the expense of increased random access latency. Challenges exist therefore in scaling the number of downlink beams usable in a network, for finer-grained beamforming with corresponding improvements in received-signal quality, especially without increasing random access latency.

SUMMARY

It is an object of the invention to provide a method with which a random access procedure can be successfully performed with reduced preamble collision probability and/or with low latency in the event of beamformed communication.

In particular, some embodiments herein capitalize on situations in which preferred synchronization signal block (SSB) reporting via random access preamble selection is less important. Some embodiments do so in order to make more random access preambles available for selection in those situations and/or in other situations in which such reporting is more important. By making more random access preambles available for selection, some embodiments better accommodate scaling in the number of downlink beams, without undesirably increasing random access latency.

According to some embodiments in this regard, a set of one or more random access preambles is not associated with any of multiple synchronization signal blocks (SSBs) transmittable by a radio network node. A wireless communication device can select a random access preamble from this set in situations when preferred SSB reporting via preamble selection is less important, e.g., early data transmission (EDT) or contention-free random access (CFRA). In these situations, for example, the radio network node may either not need to perform beamforming for the wireless communication device or may be able to determine which downlink beam(s) to use for the wireless communication device even without the wireless communication device reporting its preferred SSB via preamble selection. It may be sufficient in these situations, for instance, if the radio network node just uses downlink-uplink reciprocity for estimating which downlink beam(s) to use for the wireless communication device. Regardless, with the random access preambles in the set not being associated with any of the SSBs, some embodiments effectively provide additional preamble allocation freedom. This freedom may for example be used to make more random access preambles available for selection in certain situations than if the random access preambles were associated with an SSB.

More particularly, embodiments herein include a method performed by a wireless communication device. The method comprises receiving, from a radio network node configured to transmit multiple SSBs, a random access configuration which configures the wireless communication device with a set of one or more random access preambles that is not associated with any of the multiple SSBs.

In some embodiments, the random access configuration, or the set of one or more random access preambles, is specific for a random access procedure that is of a certain type and/or for a certain type of service. For example, in some embodiments, the certain type of random access procedure is a two-step random access procedure in which a random access preamble and a payload are transmitted by the wireless communication device in a first step and a random access response is received by the wireless communication device in a second step occurring after the first step. In other embodiments, the certain type of random access procedure is a contention-free random access procedure. Alternatively or additionally, the certain type of service in some embodiments is an early data transmission service in which user data is transmitted during a random access procedure.

In some embodiments, other sets of one or more random access preambles are associated with different respective ones of the multiple SSBs. In one or more of these embodiments, each of the other sets includes different subsets of one or more random access preambles, with different subsets being specific for random access procedures that are of different respective types or for different respective types of services.

In some embodiments, the method further comprises performing a random access procedure with the radio network node using a random access preamble from the set of one or more random access preambles that is not associated with any of the multiple SSBS, based on the random access procedure being of the certain type and/or for the certain type of service.

In some embodiments, the random access configuration includes one or more fields that indicate whether or not the set of one or more random access preambles is associated with any of the multiple SSBs.

In some embodiments, the random access configuration indicates the set of one or more random access preambles that is not associated with any of the multiple SSBs. In one or more of these embodiments, available random access preambles have respective indices, and the random access configuration indicates the set one or more random access preambles via a first field that indicates a number of the one or more random access preambles and a second field that indicates a starting index. The one or more random access preambles comprise said number of the available random access preambles that are consecutively indexed starting from said starting index.

In some embodiments, the method further comprises enabling or disabling the random access configuration. This enabling or disabling may be based on at least one of any one or more of: whether a downlink signal measurement meets one or more signal measurement criteria; an amount of user data to be transmitted from the wireless communication device to the radio network node during a random access procedure; an expected interval of time between consecutive user data transmissions by the wireless communication device; latency and/or reliability requirements of a service for which random access is to be used; a random access channel load; and an event that triggered a random access procedure to be performed.

In some embodiments, the method further comprises attempting random access using the random access configuration, and, after random access using the random access configuration fails a threshold number of times or fails to complete within a threshold duration, switching to attempting random access using a different random access configuration. This different random access configuration does not configure the wireless communication device with a set of random access preambles that is not associated with any of the multiple SSBs.

In some embodiments, other sets of one or more random access preambles are associated with different respective ones of the multiple SSBs.

In some embodiments, the method further comprises transmitting capability information that indicates whether or not the wireless communication device supports a random access configuration which configures the wireless communication device with a set of random access preambles that is not associated with any of the multiple SSBs.

In some embodiments, the method further comprises selecting, from the one or more random access preambles indicated, a random access preamble to use for performing a random access procedure with the radio network node. The method may then comprise performing the random access procedure with the radio network node using the selected random access preamble.

Embodiments herein also include a method performed by a radio network node. The method comprises transmitting multiple SSBs. The method also comprises transmitting, from the radio network node to a wireless communication device, a random access configuration which configures the wireless communication device with a set of one or more random access preambles that is not associated with any of the multiple SSBs.

In some embodiments, the random access configuration, or the set of one or more random access preambles, is specific for a random access procedure that is of a certain type and/or for a certain type of service. For example, in some embodiments, the certain type of random access procedure is a two-step random access procedure in which a random access preamble and a payload are transmitted by the wireless communication device in a first step and a random access response is received by the wireless communication device in a second step occurring after the first step. In other embodiments, the certain type of random access procedure is a contention-free random access procedure. Alternatively or additionally, the certain type of service in some embodiments is an early data transmission service in which user data is transmitted during a random access procedure.

In some embodiments, other sets of one or more random access preambles are associated with different respective ones of the multiple SSBs. In one or more of these embodiments, each of the other sets includes different subsets of one or more random access preambles, with different subsets being specific for random access procedures that are of different respective types or for different respective types of services.

In some embodiments, the random access configuration includes one or more fields that indicate whether or not the set of one or more random access preambles is associated with any of the multiple SSBs.

In some embodiments, the random access configuration indicates the set of one or more random access preambles that is not associated with any of the multiple SSBs. In one or more of these embodiments, available random access preambles have respective indices, and the random access configuration indicates the set one or more random access preambles via a first field that indicates a number of the one or more random access preambles and a second field that indicates a starting index. The one or more random access preambles comprise said number of the available random access preambles that are consecutively indexed starting from said starting index.

In some embodiments, the method further comprises enabling or disabling the random access configuration, or deciding whether or not to re-configure the random access configuration. This enabling, disabling, or deciding may be based on at least one of any one or more of: whether a downlink signal measurement meets one or more signal measurement criteria; an amount of user data to be transmitted from the wireless communication device to the radio network node during a random access procedure; an expected interval of time between consecutive user data transmissions by the wireless communication device; latency and/or reliability requirements of a service for which random access is to be used; a random access channel load; and an event that triggered a random access procedure to be performed.

In some embodiments, the method further comprises receiving a random access preamble from the wireless communication device as part of a random access procedure, determining which of multiple random access configurations the wireless communication device used for the random access procedure, and determining whether or not the received random access preamble is associated with one of the multiple SSBs, based on whether or not the determined random access configuration configures the wireless communication device with a set of random access preambles that is not associated with any of the multiple SSBs.

In some embodiments, the method further comprises making a decision as to whether or not to configure the wireless communication device with the random access configuration, wherein the decision is specific to the wireless communication device.

In some embodiments, other sets of one or more random access preambles that are associated with different respective ones of the multiple SSBs.

In some embodiments, the method further comprises receiving capability information that indicates whether or not the wireless communication device supports a random access configuration which configures the wireless communication device with a set of random access preambles that is not associated with any of the multiple SSBs.

In some embodiments, the method further comprises receiving, from the wireless communication device, as part of a random access procedure, a random access preamble included in the set. The method may further comprise transmitting, from the radio network node to the wireless communication device, a random access response as a response to the random access preamble, by transmitting the random access response on one or more downlink beams that are estimated from measurement of an uplink beam or uplink signal from the wireless communication device.

In some embodiments, the method further comprises receiving, from the wireless communication device, as part of a random access procedure, a random access preamble included in the set. The method may further comprise transmitting, from the radio network node to the wireless communication device, a random access response as a response to the random access preamble, by transmitting the random access response on a wide beam (e.g., 60 degrees) or an omnidirectional beam (e.g., 360 degrees).

Embodiments herein also include corresponding apparatus, computer programs, and carriers of those computer programs. For example, embodiments herein include a wireless communication device, e.g., comprising communication circuitry and processing circuitry. The wireless communication device is configured to receive, from a radio network node configured to transmit multiple SSBs, a random access configuration which configures the wireless communication device with a set of one or more random access preambles that is not associated with any of the multiple SSBs.

Embodiments herein further include a radio network node, e.g., comprising communication circuitry and processing circuitry. The radio network node is configured to transmit multiple SSBs. The radio network node is also configured to transmit, from the radio network node to a wireless communication device, a random access configuration which configures the wireless communication device with a set of one or more random access preambles that is not associated with any of the multiple SSBs.

BRIEF DESCRIPTION OF THE DRAWINGS

FIG. 3B is a block diagram of random access preamble sets associated with respective SSBs as well as a set of random access preamble(s) not associated with any SSB according to some embodiments.

FIG. 3C is a block diagram of random access preamble sets associated with respective SSBs as well as a set of random access preamble(s) not associated with any SSB according to other embodiments.

FIG. 3D is a block diagram of random access preamble sets associated with respective SSBs as well as a set of random access preamble(s) not associated with any SSB according to yet other embodiments.

FIG. 8 is a logic flow diagram of a method performed by a wireless communication device according to some embodiments.

FIG. 9 is a logic flow diagram of a method performed by a radio network node according to some embodiments.

DETAILED DESCRIPTION

Figure 1:
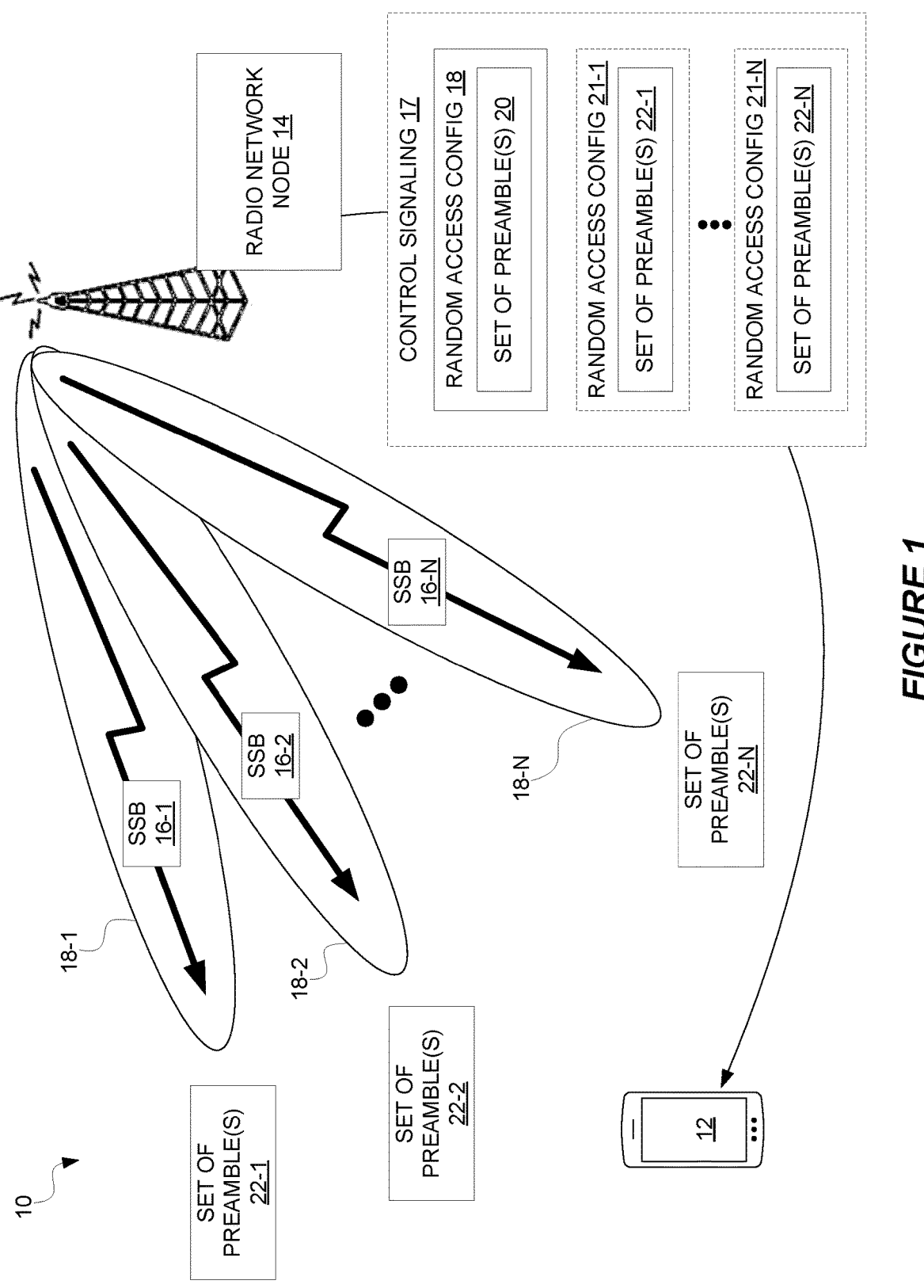
FIG. 1 is a block diagram of a wireless communication network according to some embodiments.

FIG. 1 shows a wireless communication network 10 configured to provide wireless communication service to one or more wireless communication devices, including wireless communication device 12. The wireless communication network 10 in this regard includes a radio network node 14 (e.g., a base station) configured to provide wireless communication coverage over at least a portion of a geographical area served by the wireless communication network 10. The radio network node 14 may for example provide one or more cells via which wireless communication devices are served.

To assist wireless communication devices with their search for wireless communication service (e.g., via cell search), the radio network node 14 as shown transmits multiple synchronization signal blocks (SSBs) 16-1 . . . 16-N. Each SSB as used herein comprises one or more synchronization signals and a broadcast channel transmitted collectively within a block of contiguous resource elements, e.g., time-frequency resources. In embodiments where the radio network node 14 is capable of beamforming, the multiple SSBs 16-1 . . . 16-N may be transmitted on different respective downlink beams 18-1 . . . 18-N so that each SSB is associated with a respective downlink beam. The multiple SSBs 16-1 . . . 16-N in this case are spatially multiplexed across the different downlink beams 18-1 . . . 18-N.

The radio network node 14 also transmits a random access configuration 18 to the wireless communication device 12, e.g., via control signaling 17 such as Radio Resource Control (RRC) signaling. The random access configuration 18 configures the wireless communication device 12 with one or more parameters that govern random access to the wireless communication network 10. In particular, the random access configuration 18 configures the wireless communication device 12 with one or more random access preambles to use for random access, e.g., by transmitting a random access preamble during a certain random access channel occasion. In some embodiments, a random access preamble is generated based on a cyclically shifted version of a Zadoff-Chu sequence.

Notably, according to embodiments herein, the random access configuration 18 configures the wireless communication device 12 with a set 20 of one or more random access preambles, where this set 20 is not associated with any of the multiple SSBs 16-1 . . . 16-N. That the set 20 is not associated with any of the multiple SSBs 16-1 . . . 16-N means in some embodiments that the set 20 is not mapped to any of the multiple SSBs 16-1 . . . 16-N, i.e., there is no preamble-to-SSB mapping for the set 20 of preamble(s). With no mapping to or other association with any of the multiple SSBs 16-1 . . . 16-N, the random access preamble(s) in the set 20 do not indicate anything about which of the SSBs 16-1 . . . 16-N (or which of the associated downlink beams 18-1 . . . 18-N) the wireless communication device 12 prefers when transmitted as part of random access. That is, if the wireless communication device 12 transmits one of the random access preambles from set 20 as part of random access, transmission of that random access preamble does not report the SSB or downlink beam preferred by the wireless communication device 12, e.g., in terms of which SSB or downlink beam was received by the wireless communication device 12 with the best signal strength or quality.

In some embodiments, the set 20 of random access preamble(s) that is not associated with any of the SSBs 16-1 . . . 16-N contrasts with other sets 22-1 . . . 22-N of random access preamble(s) that are associated with different respective ones of the SSBs 16-1 . . . 16-N. The radio network node 14 in this regard may transmit other random access configurations 21-1 . . . 21-N that respectively configure the wireless communication device 12 with these other sets 22-1 . . . 22-N of random access preamble(s). As shown in FIG. 1, set 22-1 is associated with SSB 16-1, set 22-2 is associated with SSB 16-2, and set 22-N is associated with SSB 16-N. This association may be implemented by mapping set 22-1 to SSB 16-1, mapping set 22-2 to SSB 16-2, and mapping set 22-N to SSB 16-N. With this mapping or other association between random access preamble sets and SSBs, the random access preambles in these sets 22-1 . . . 22-N may indeed indicate something about which of the SSBs 16-1 . . . 16-N (or which of the associated downlink beams 18-1 . . . 18-N) the wireless communication device 12 prefers when transmitted as part of random access. For example, if the wireless communication device 12 transmits one of the random access preambles from set 22-1 as part of random access, transmission of that random access preamble reports that the wireless communication device 12 prefers SSB 16-1 or downlink beam 18-1, e.g., based on the wireless communication device 12 receiving that SSB 16-1 or downlink beam 18-1 with the best signal strength or quality.

In some embodiments, whether the wireless communication device 12 is to use the random access configuration 18 (or the set 20) depends on whether the wireless communication device 12 needs to use preamble selection to report something about which of the SSBs 16-1 . . . 16-N (or which of the associated downlink beams 18-1 . . . 18-N) the wireless communication device 12 prefers. If the wireless communication device 12 needs to report this via preamble selection, the wireless communication device 12 is to use one of the other random access configurations 21-1 . . . 21-N so as to use a random access preamble from one of the sets 22-1 . . . 22-N. But if the wireless communication device 12 need not report this via preamble selection, the wireless communication device 12 is to instead use the random access configuration 18 so as to use a random access preamble from the set 20 that is not associated with any of the SSBs 16-1 . . . 16-N.

In some embodiments, whether the wireless communication device 12 needs to report a preferred SSB via preamble selection is situation dependent. Indeed, some embodiments herein recognize that the wireless communication device 12 reporting a preferred SSB via preamble selection is more important in some situations than in others. In some situations, for example, the radio network node 14 either does not need to perform beamforming for the wireless communication device 12 or can determine which downlink beam(s) would be preferred or at least acceptable to use for the wireless communication device 12 even without the wireless communication device 12 having to report its preferred SSB via preamble selection. Regardless of the particular reasons why such reporting may be less important in some situations, though, some embodiments exploit these situations as opportunities to make more random access preambles available for selection in these situations and/or in other situations in which this reporting is more important. By making more random access preambles available for selection, preambles for selection in some situations will not be as easily exhausted as the number of SSBs (and corresponding downlink beams) scales.

In one or more embodiments, then, the random access configuration 18 and/or the set 20 of random access preamble(s) that is not associated with any of the SSBs 16-1 . . . 16-N is specific for one or more certain situations, e.g., in which the wireless communication device 12 need not report a preferred SSB via preamble selection. The certain situation(s) may include, for example, when the wireless communication device 12 performs a certain type of random access procedure, such that the random access configuration 18 and/or the set 20 of random access preamble(s) is specific for the certain type of random access procedure. The certain type of random access procedure may include, for instance, a contention-free random access (CFRA) procedure or a two-step random access procedure (as opposed to a four-step random access procedure). Indeed, in the contention-free random access procedure situation, the radio network node 14 presumably already knows the wireless communication device's preferred SSB or downlink beam, since the radio network node 14 and the wireless communication device 12 must have already communicated for allocation of a contention-free random access preamble to the wireless communication device 12. And, in the two-step random access procedure situation, the wireless communication device 12 may be able to indicate its preferred SSB in other ways besides preamble selection, e.g., via an indication in msgA since no timing advance is needed for the msgA transmission.

Alternatively or additionally, the certain situations may include when the wireless communication device performs a random access procedure for a certain type of service, such that the random access configuration 18 and/or the set 20 of random access preamble(s) is specific for that certain type of service. The certain type of service may include for instance early data transmission (EDT). When random access is performed for EDT, user data is transmitted to or from the wireless communication device 12 already during the random access procedure. Especially if no more user data needs to be transmitted after completion of the random access procedure within a certain amount of time, use of the most preferred downlink beam is not important as long as the random access procedure can complete successfully for EDT.

Figure 2:
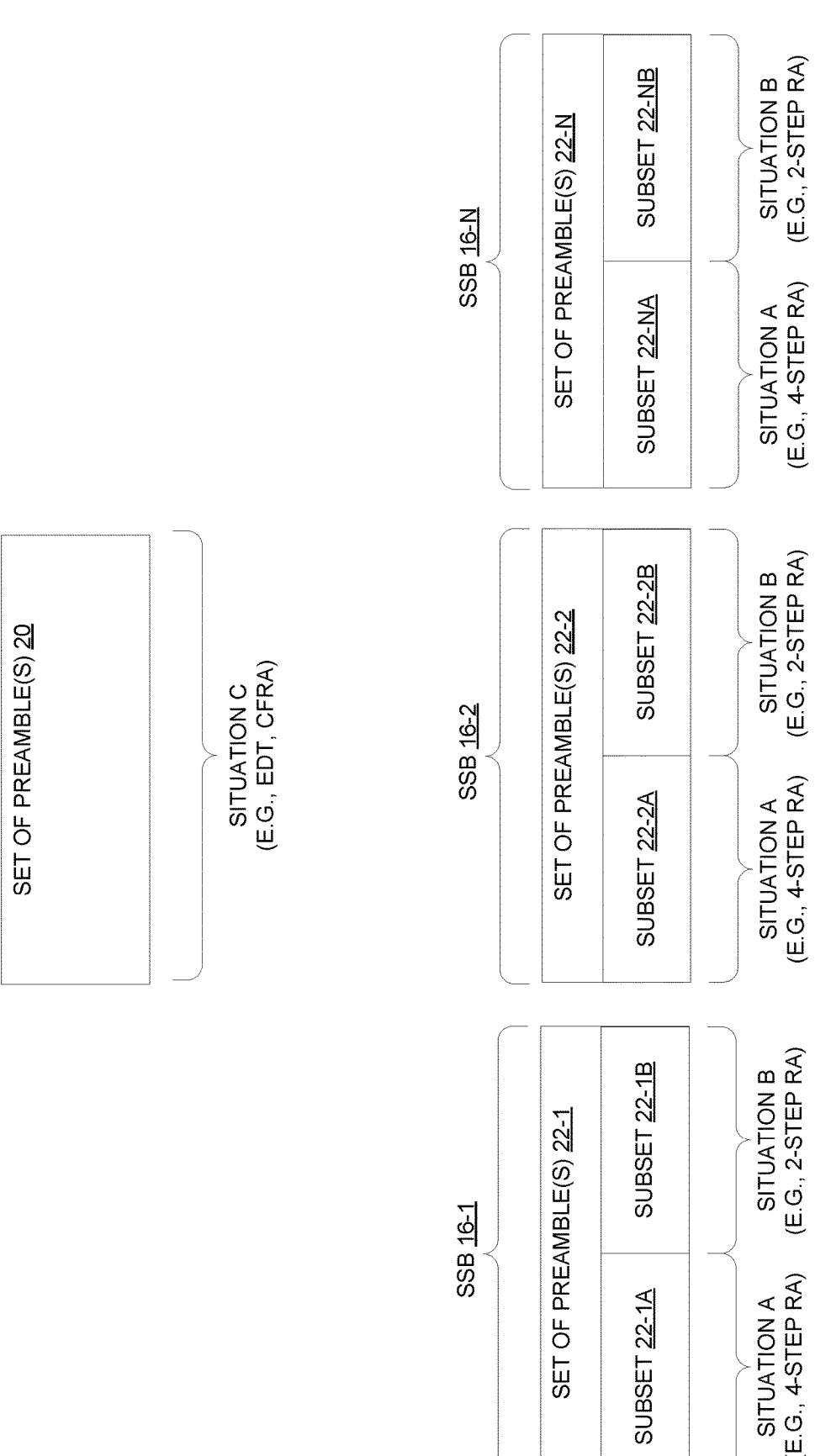
FIG. 2 is a block diagram of random access preamble sets according to some embodiments.

FIG. 2 illustrates one or more of these embodiments in the context of an example. As shown in FIG. 2, the different sets 22-1, 22-2, . . . 22-N of preamble(s) are respectively associated with the different SSBs 16-1, 16-2, . . . 16-N transmittable by the radio network node 14, whereas the set 20 of preamble(s) is not associated with any of those SSBs. The set 20 of preamble(s) that is not associated with any of the SSBs 16-1 . . . 16-N is specific for situation C, e.g., CFRA or EDT. On the other hand, each of the other sets 22-1, 22-2, . . . 22-N of preamble(s) that is associated with an SSB includes different subsets of one or more random access preambles. Different subsets are specific for different respective situations, e.g., for random access procedures that are of different respective types or for different respective types of services. As shown, for example, preamble set 22-1 includes one subset 22-1A that is specific for situation A (e.g., 4-step RA) and another subset 22-1B that is specific for situation B (e.g., 2-step RA). Preamble set 22-2 similarly includes one subset 22-2A that is specific for situation A and another subset 22-2B that is specific for situation B. And preamble set 22-N likewise includes one subset 22-NA that is specific for situation A and another subset 22-NB that is specific for situation B. In situation C, therefore, the wireless communication device 12 may perform a random access procedure with the radio network node 14 using a random access preamble from the set 20 that is not associated with any of the SSBs, e.g., based on the random access procedure being of a certain type and/or for a certain type of service. In situation A or situation B, by contrast, the wireless communication device 12 may perform a random access procedure using a random access preamble from one of the sets 22-1 . . . 22-N, depending on its preferred SSB.

Figure 3A:
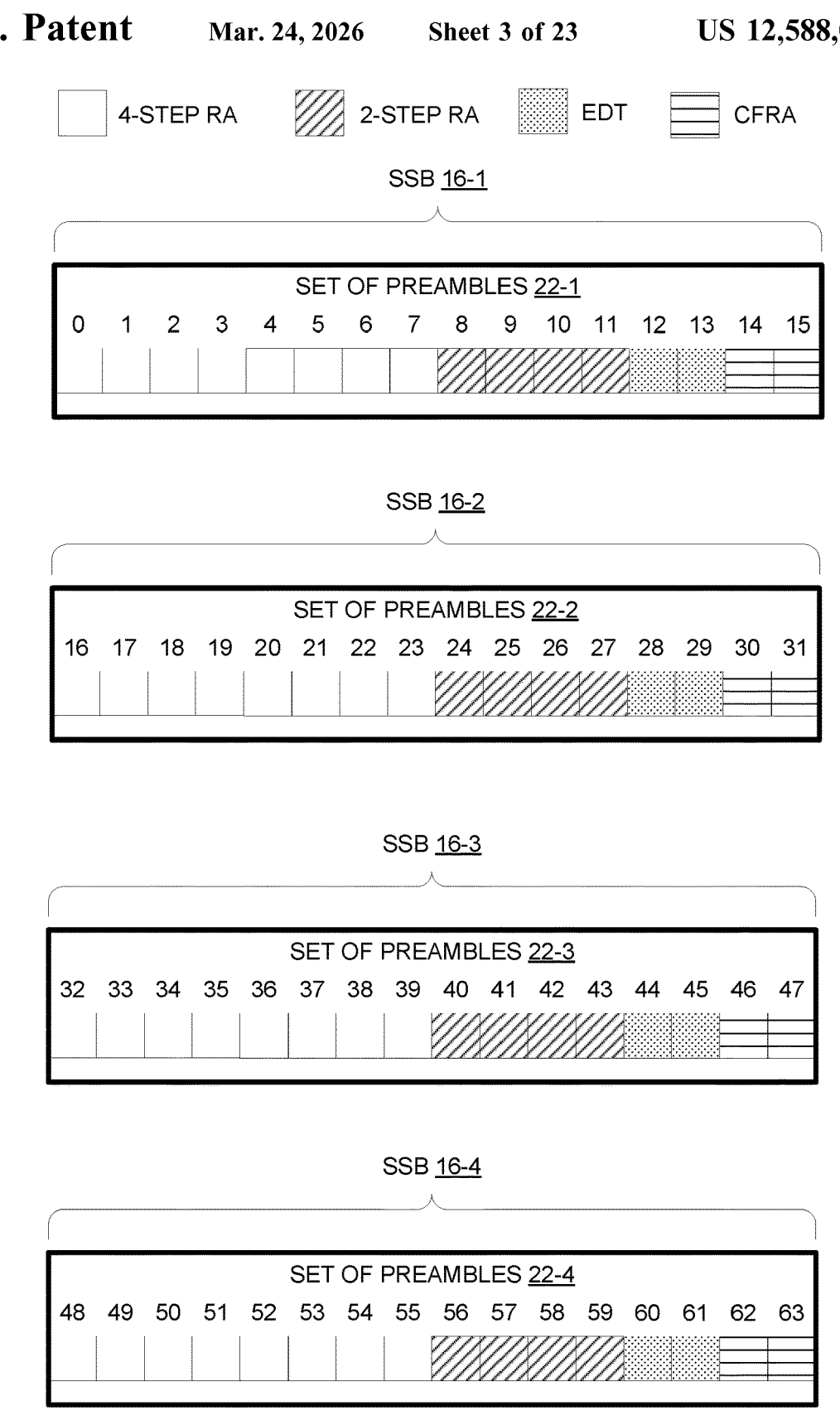
FIG. 3A is a block diagram of random access preamble sets associated with respective SSBs.

FIGS. 3A-3B illustrate a concrete example of how these embodiments may make more random access preambles available for selection in some situations. FIG. 3A in this regard shows 64 preambles with indices 0 to 63. Each of the 64 preambles is associated with an SSB. In particular, the 64 preambles are divided into four sets 22-1, 22-2, 22-3, and 22-4 of 16 preambles each. Set 22-1 is mapped to SSB 16-1, set 22-2 is mapped to SSB 16-2, set 22-3 is mapped to SSB 16-3, and set 22-4 is mapped to SSB 16-4. Within each set, a subset that includes the first 8 preambles is specific for 4-step random access (RA), a subset that includes the next 4 preambles is specific for 2-step RA, a subset that includes the next 2 preambles is specific for EDT, and a subset that includes the last 2 preambles is specific for CFRA. With only 2 preambles specific for EDT or CFRA within any given set, preamble collision would occur if more than 2 wireless communication devices prefer the same SSB and perform random access for EDT or CFRA.

FIG. 3B by contrast shows 48 preambles that are each associated with an SSB and 16 preambles that are not associated with any of the SSBs. In particular, 48 preambles are divided into four sets 22-1, 22-2, 22-3, and 22-4 of 12 preambles each. Set 22-1 is still mapped to SSB 16-1, set 22-2 is still mapped to SSB 16-2, set 22-3 is still mapped to SSB 16-3, and set 22-4 is still mapped to SSB 16-4. And within each set, a subset that includes the first 8 preambles is still specific for 4-step random access (RA), and a subset that includes the next 4 preambles is still specific for 2-step RA. However, the remaining 16 preambles belong to a set 20 of preambles that is not associated with any of the SSBs. Some of the preambles in this set 20 are specific for EDT and others of the preambles in the set 20 are specific for CFRA. But none of the preambles in the set 20 are associated with a particular SSB. This means that, in this example, 8 preambles in set 20 are specific for EDT and 8 other preambles in set 20 are specific for CFRA. Rather than wireless communication devices being limited to only 2 preambles from which to select for EDT or CFRA in FIG. 3A, wireless communication devices according to FIG. 3B are able to select from 8 preambles for EDT or CFRA. With 8 preambles specific for EDT or CFRA within set 20, and since the preambles are not associated with any SSB, preamble collision would occur only if more than 8 wireless communication devices perform random access for EDT or CFRA across different possible SSB preferences. So, for example, whereas preamble collision would occur in FIG. 3A if 3 wireless communication devices prefer SSB 16-1 and perform random access for EDT or CFRA, no such collision would occur in FIG. 3B.

FIG. 3C illustrates another example. Rather than making more preambles available for selection in situations like EDT or CFRA (e.g., where preferred SSB reporting via preamble selection may be less important), this example makes more preambles available for selection in other situations (e.g., where preferred SSB reporting via preamble selection may be more important). In particular, FIG. 3C shows 60 preambles that are each associated with an SSB and 4 preambles that are not associated with any of the SSBs. In particular, 60 preambles are divided into four sets 22-1, 22-2, 22-3, and 22-4 of 15 preambles each. Set 22-1 is still mapped to SSB 16-1, set 22-2 is still mapped to SSB 16-2, set 22-3 is still mapped to SSB 16-3, and set 22-4 is still mapped to SSB 16-4. And within each set, a subset that includes the first 9 preambles is specific for 4-step random access (RA), and a subset that includes the next 6 preambles is specific for 2-step RA. However, the remaining 4 preambles belong to a set 20 of preambles that is not associated with any of the SSBs. Two of the preambles in this set 20 are specific for EDT and two others of the preambles in the set 20 are specific for CFRA. But none of the preambles in the set 20 are associated with a particular SSB. In this example, then, wireless communication devices are still limited to only 2 preambles from which to select for EDT or CFRA as in FIG. 3A. But, wireless communication devices according to FIG. 3C are able to select from 9 preambles for 4-step RA and from 6 preambles for 2-step RA, thereby decreasing the chances of preamble collision as compared to FIG. 3A.

Although FIGS. 3B and 3C were illustrated as separate examples, other embodiments herein include a combination of FIG. 3B and FIG. 3C. One such embodiment may not only make more preambles available for selection for EDT or CFRA but also make more preambles available for selection for 4-step RA or 2-step RA.

Moreover, although FIGS. 3B and 3C illustrates the set 20 as including at least some preambles with non-contiguous indices, the set 20 in other embodiments may include only preambles with contiguous indices. FIG. 3D for example illustrates how FIG. 3B may be modified so that the set 20 includes preambles with contiguous indices 48-63.

Regardless of the particular way that the random access configuration 18 configures the set 20 of random access preambles, some embodiments herein account for the fact that the random access configuration 18 may not always be needed or be the most appropriate. According to these embodiments, the random access configuration 18 may be enabled or disabled, e.g., on a dynamic or semi-static basis. In some embodiments, the wireless communication device 12 itself autonomously enables or disables the random access configuration 18, e.g., based on one or more criteria, conditions, or factors governing enablement or disablement. In other embodiments, the radio network node 14 controls whether the random access configuration 18 is enabled or disabled and signals commands to the wireless communication device 12 to enable or disable the random access configuration 18. Where enabled or disabled by the radio network node 14, the radio network node 14 may do so on a device by device basis.

More particularly, in one or more embodiments, the random access configuration 18 is enabled or disabled based on whether a downlink signal measurement performed by the wireless communication device 12 meets one or more signal measurement criteria, e.g., in terms of Reference Signal Received Power (RSRP), Reference Signal Received Quality (RSRQ), Received Signal Strength Indicator (RSSI), signal-to-noise-plus-interference-ratio (SINR), channel occupancy, etc. The measurement criteria (e.g., threshold(s)) may be signaled from the radio network node 14 to the wireless communication device 12 in embodiments where the decision to enable or disable the configuration 18 is made by the wireless communication device 12. Regardless, meeting of the one or more signal measurement criteria may for instance suggest that preferred SSB reporting is not needed or is less important, since the wireless communication device's radio conditions may be good enough for the wireless communication device 12 to receive in the downlink even without downlink beamforming or even if a wide or omnidirectional downlink beam is used. In such embodiments, then, the random access configuration 18 may be enabled if the downlink signal measurement exceeds a minimum threshold and/or be disabled if the downlink signal measurement falls below the same or a different threshold.

Alternatively or additionally, the random access configuration 18 in some embodiments is enabled or disabled based on an amount of user data to be transmitted from the wireless communication device 12 to the radio network node 14 during a random access procedure, e.g., as part of EDT. The amount of user data here may be quantified in terms of how many packets are to be transmitted and/or a size of the packet(s). In some embodiments, for example, the random access configuration 18 is enabled if the wireless communication device 12 has only a single packet to transmit (e.g., triggering EDT) and the packet is small enough to be transmitted in msgA of a 2-step RA procedure. Alternatively or additionally, the random access configuration 18 may be enabled or disabled based on an expected interval of time between consecutive user data transmissions by the wireless communication device 12. In some embodiments, for example, the random access configuration 18 is enabled if the expected interval of time between consecutive packets is greater than a threshold interval, e.g., which suggests that use of a non-preferred beam would be less important. Enabling and disabling the random access configuration 18 based on the amount of user data to be transmitted and/or based on the expected interval or time between consecutive transmissions may be configured or performed per service or logical channel at the wireless communication device 12, e.g., the wireless communication device 12 only enables the random access configuration 18 if the service or logical channel for which random access is to be performed is configured to support the random access configuration 18.

Alternatively or additionally, the random access configuration 18 in some embodiments is enabled or disabled based on latency and/or reliability requirements of a service for which random access is to be used. For example, even if the wireless communication device 12 is to transmit many packets in a burst, if those packet transmissions have no strict requirements in terms of latency and/or reliability, use of a non-preferred beam may be less important. In this case, the random access configuration 18 may be enabled.

Alternatively or additionally, the random access configuration 18 in some embodiments is enabled or disabled based on a random access channel load. The random access configuration 18 in some embodiments, for example, is enabled if the random access channel load exceeds a threshold but disabled if the random access channel load falls below the same or a different threshold. Indeed, since enabling the random access configuration 18 makes more random access preambles available for use in some situations, selectively enabling the configuration 18 when the random access channel load is high may help to reduce the chances of preamble collisions in the face of high load. On the other hand, since disabling the random access configuration 18 may better facilitate beamforming in some situations, selectively disabling the configuration 18 when the random access channel load is low may improve signal quality at the wireless communication device when preamble collisions are less likely due to low load.

Alternatively or additionally, the random access configuration 18 in some embodiments is enabled or disabled based on an event that triggered a random access procedure to be performed. The random access configuration 18 may for example be disabled for one or more certain triggering events but otherwise enabled (or vice versa). For example, the random access configuration 18 may be disabled for triggering events that are deemed high priority, such as beam failure recovery, handover, or consistent listen-before-talk (LBT) failure, but disabled for triggering events that are deemed low priority.

Although each condition or criteria for enabling or disabling the random access configuration 18 was described separately, at least some of those conditions or criteria may be usable in combination according to some embodiments. In one or more embodiments, for instance, the random access configuration 18 may be enabled for the wireless communication device 12 if at least one of the above-described conditions or criteria is fulfilled. If none of the above-described conditions or criteria are fulfilled, then the random access configuration 18 is disabled for the wireless communication device 12.

In other embodiments, rather than enabling or disabling the random access configuration 18 based on the above described condition(s) or criteria, the wireless communication device 12 may decide whether or not to use the random access configuration 18 based on those condition(s) or criteria. This decision may be made for instance as part of selecting between which of multiple random access configurations the wireless communication device 12 is to use.

In still other embodiments, the radio network node 14 may decide whether or how to re-configure the random access configuration 18 based on the above described condition(s) or criteria. For example, the radio network node 14 may decide to re-configure the random access configuration 18 to configure the wireless communication device 12 with a set of random access preamble(s) that are associated with an SSB, under conditions described above for disabling the random access configuration 18. To support these or other embodiments, the wireless communication device 12 may transmit capability information (e.g., a capability bit) that indicates whether or not the wireless communication device 12 supports a random access configuration, like random access configuration 18, which configures the wireless communication device 12 with a set of random access preambles that is not associated with any of the multiple SSBs.

In yet other embodiments herein, the wireless communication device 12 first attempts random access using the random access configuration 18 (that configures a set of preamble(s) not associated with any SSB) but, if needed, falls back to a different random access configuration (that configures a set of preamble(s) associated with an SSB). For example, the wireless communication device 12 may monitor whether random access using the random access configuration 18 fails a threshold number of times or fails to complete within a threshold duration. The wireless communication device 12 may supervise this for instance using a threshold received from the radio network node 14, or using a timer set to a threshold duration configured by the radio network node 14. Regardless, after random access using the random access configuration 18 fails the threshold number of times or fails to complete within the threshold duration, the wireless communication device 12 may switch to attempting random access using the different random access configuration. With this different random access configuration, the wireless communication device 12 may transmit a random access preamble that is associated with a preferred SSB. This way, if the lack of association between preambles and SSBs ends up proving problematic for completing the random access procedure (e.g., because the wireless communication device 12 fails to receive a random access response on a wide beam), resort to a different random access configuration with such an association between preambles and SSBs may salvage the wireless communication device's random access attempt.

In any event, note that the random access configuration 18 according to some embodiments is configured for a specific cell, bandwidth part (BWP), channel, or carrier on which the wireless communication device 12 is to perform random access. In some embodiments, then, whether a set of pre-amble(s) not associated with any SSB is configured may depend on which cell, BWP, channel, or carrier the wireless communication device 12 performs random access on. In this way, some embodiments may aim to reduce the pre-amble occupation or usage so as to especially benefit a cell, BWP, channel, or carrier which has a high random access channel load.

Note further that embodiments herein that exploit the random access configuration 18 may be applicable to random access performed in licensed frequency spectrum or in unlicensed frequency spectrum. Similarly, embodiments herein may be applicable to 4-step random access or 2-step random access, as well as to contention-based random access or contention-free random access.

Note also that while the random access configurations 21-1 . . . 21-N are depicted in FIG. 1 as being separate from random access configuration 18, one or more of those configurations 21-1 . . . 21-N may be part of random access configuration 18.

Moreover, note that a random access preamble herein may comprise all or part of a random access resource. In some embodiments for example where a random access preamble comprises part of a random access resource, a random access resource may comprise a combination of at least a random access preamble and a random access channel occasion. A random access channel occasion is an occurrence in time and/or frequency of a radio resource configured for trans-mission of a random access preamble. In some embodiments where a certain random access resource comprises a com-bination of a certain random access preamble and a certain random access channel occasion, the certain random access preamble may not be associated with any of the SSBs but the certain random access channel occasion may indeed be associated with one of the SSBs. That is, in some embodi-ments, there may be an association between random access channel occasions and SSBs, if or even if there is not an association between the set 20 of one or more random access preambles and SSBs. SSBs may for example be mapped to different random access channel occasions to achieve ran-dom access channel load balancing.

Although some embodiments herein were described in a context where different sets of random access preambles are mapped to different respective SSBs, other embodiments herein may be applied in a similar way to a context where different sets of random access preambles are mapped to different respective downlink signals or channels of a certain type. For example, some embodiments may be applied in a context where different sets of random access preambles are mapped to different respective synchronization signals (e.g., PSSs or SSSs), different respective broadcast channels (e.g., PBCHs), or different respective Channel State Information (CSI) reference signals (CSI-RSs). That is, the certain type may be a synchronization signal, a broadcast channel, or a CSI-RS, as just a few examples. In such embodiments, the different downlink signals or channels of the certain type may be transmitted over different respective downlink beams, e.g., such that different downlink signals or channels of the certain type are associated with respective downlink beams. Accordingly, in this alternative context where the radio network node 14 transmits multiple downlink signals or channels of a certain type (e.g., on different respective downlink beams), the random access configuration 18 may alternatively configure the wireless communication device 12 with a set of one or more random access preambles that is not associated with any of those multiple downlink signals or channels of the certain type. In one or more embodiments, then, some sets of random access preamble(s) are associated with one of those downlink signals or channels of the certain type, whereas at least one set of random access preamble(s) is not associated with any of those downlink signals or channels of the certain type.

Consider now an example of some embodiments herein in the context of a wireless communication network specified by 3 rd Generation Partnership Project (3GPP) standards, such as a New Radio (NR) network. In this context, random access may be performed via a 4-step random access procedure and/or via a 2-step random access procedure. These random access procedures may for instance be performed in order for the wireless communication device 12 to acquire uplink synchronization, to establish or resume a radio resource control (RRC) connection, etc.

Figure 4:
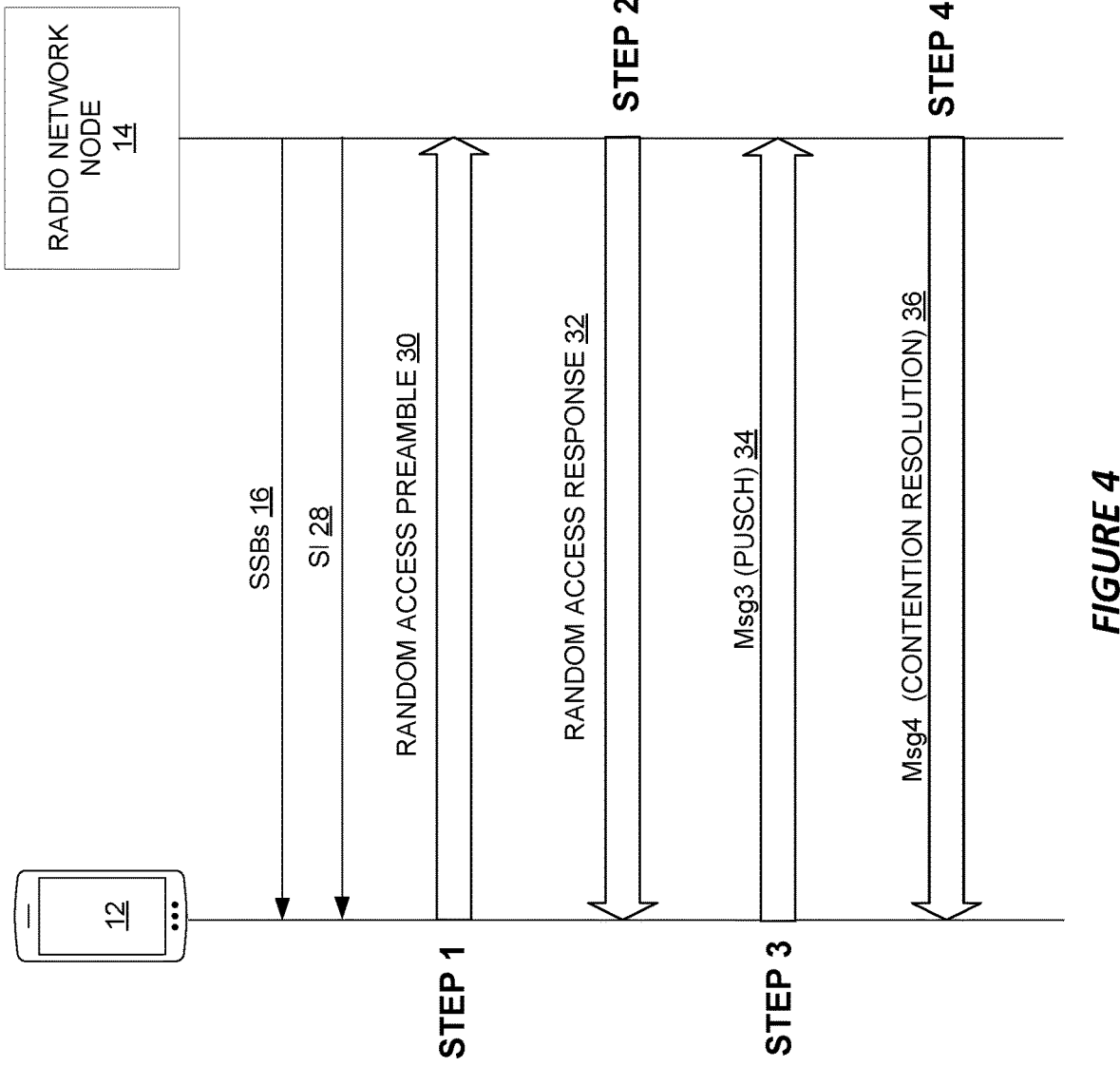
FIG. 4 is a call flow diagram of a 4-step random access procedure according to some embodiments.

FIG. 4 shows a 4-step random access procedure according to some embodiments. In this case, the radio network node 14 broadcasts the SSBs 16-1 . . . 16-N and system information (SI) 28. The wireless communication device 12 may receive at least one of the SSBs and may decode the SI 28. In some embodiments, this (in conjunction with one or more other conditions such as reception of uplink data for transmission) triggers the wireless communication device 12 to initiate the 4-step random access procedure. As part of this procedure, the wireless communication device 12 transmits a random access preamble 30 (Step 1). This random access preamble 30 may be selected according to one or more embodiments described herein, e.g., such that the random access preamble 30 may be a random access preamble from the set 20 that is not associated with any SSB or may be a random access preamble from a set 22-1 . . . 22-N that is associated with an SSB. Transmission of the random access preamble 30 may be referred to as Msg1. The random access preamble 30 may be transmitted on a Physical Random Access Channel (PRACH). In response to the random access preamble 30, the radio network node 14 may reply with a random access response 32 (RAR) referred to as Msg2 (Step 2). This RAR includes a timing advance command and an uplink grant. In one embodiment, the RAR message is included in a Medium Access Control (MAC) Protocol Data Unit (PDU) (also referred to as a MAC transport block). In this case, the MAC PDU may include a MAC PDU subheader that corresponds to the included RAR message. The MAC PDU subheader may include a field that indicates a random access preamble (RAP) identity (RAPID) identifying the random access preamble, e.g., so as to indicate that the corresponding RAR message is a response to the identified random access preamble.

Responsive to receiving Msg2, the wireless communication device 12 transmits to the radio network node 14 a message referred to as Msg3 34, e.g., on a Physical Uplink Shared Channel (PUSCH) (Step 3). Msg3 may be include or convey a so-called contention resolution identity, e.g., for resolving any contention with another wireless communication device that may have selected the same random access preamble 30. Msg3 may also include a Radio Resource Control (RRC) connection establishment or resume request. Note that the wireless communication device 12 transmits Msg3 34 using the uplink grant and timing advance command provided in Msg2. The timing advance command allows the PUSCH to be received with a timing accuracy within a cyclic prefix (CP) of Msg3. Without this timing advance, a very large CP would be needed in order for the radio network node 14 to demodulate and detect the PUSCH, unless there is a very small distance between the radio network node 14 and the wireless communication device 12.

Finally, in response to Msg3, the radio network node 14 may transmit to the wireless communication device 12, a message referred to as Msg4 36 (Step 4). Msg4 may include a contention resolution identity (e.g., as received in Msg3) in order to resolve contention. Msg4 may also include an RRC connection setup or resume message for setting up or resuming an RRC connection.

Figure 5:
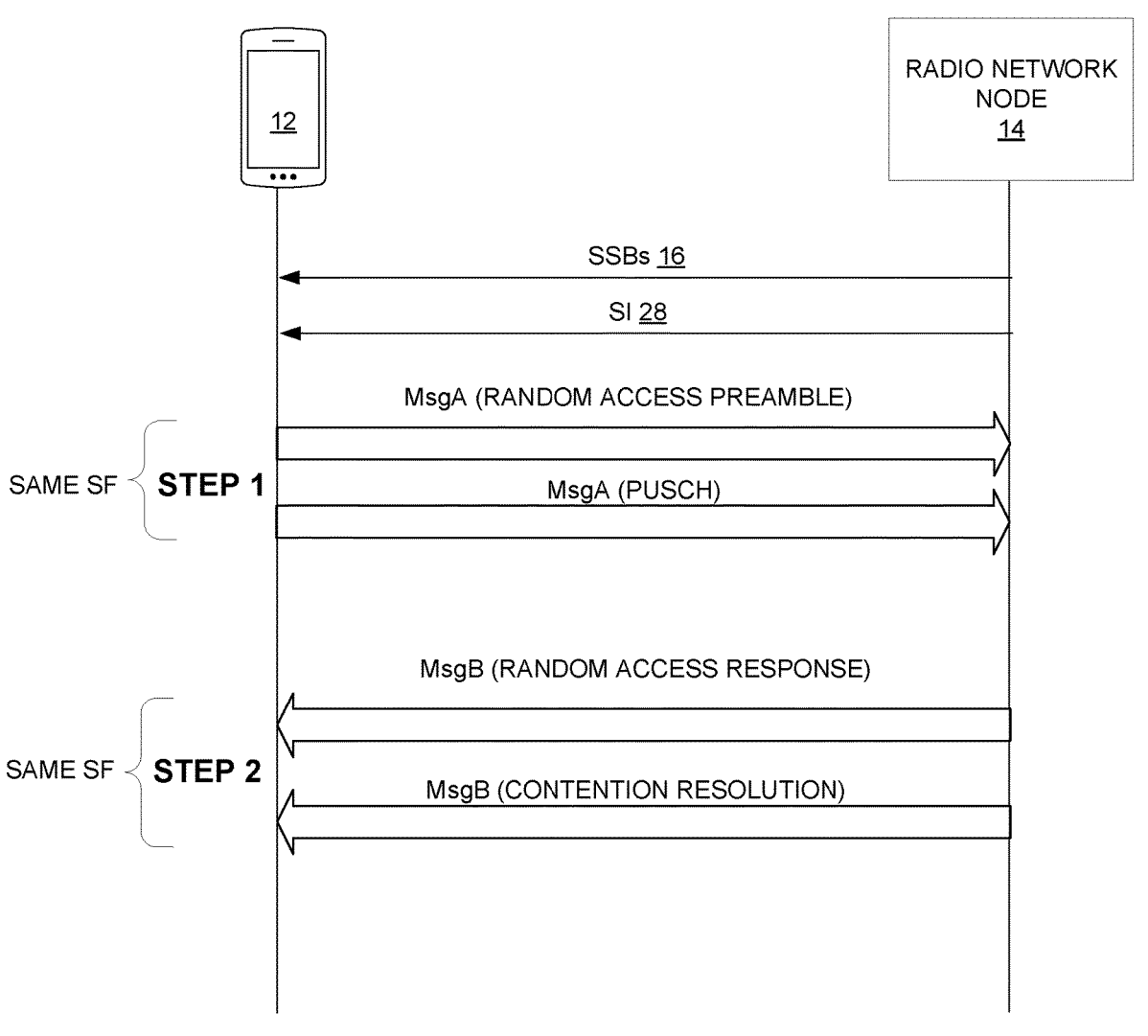
FIG. 5 is a call flow diagram of a 2-step random access procedure according to some embodiments.

FIG. 5 by contrast shows the 2-step random access procedure. The random access procedure as shown includes two steps, e.g., as opposed to the conventional 4 steps. In the first step, the wireless communication device 12 performs a transmission on a random access channel (RACH) and an uplink shared channel (e.g., a physical uplink shared channel, PUSCH). This transmission may be referred to as MsgA. The transmission on the RACH conveys the random access preamble 30. This random access preamble 30 may be selected according to one or more embodiments described herein, e.g., such that the random access preamble 30 may be a random access preamble from the set 20 that is not associated with any SSB or may be a random access preamble from a set 22-1 . . . 22-N that is associated with an SSB. The transmission on the uplink shared channel may convey an RRC establishment request or RRC resume request. The transmission on the RACH and the transmission on the uplink shared channel may be performed in the same subframe, or in successive subframes, e.g., such that the transmission on the uplink shared channel is performed before any response is received to the transmission on the RACH.

In the second step, the radio network node 14 transmits a response to the RACH and uplink shared channel transmission. If the radio network node 14 successfully decoded the RACH and the uplink shared channel payload, the radio network node 14 transmits a random access success response message (also referred to as a random access success response, or simply, success response). This random access success response message correspondingly indicates that both the RACH and the uplink shared channel payload were decoded successfully. Note in this regard that, unlike the traditional 4-step procedure, the random access success response is transmitted as a response to both the RACH and the uplink shared channel transmission.

In any event, the radio network node 14 in some embodiments conveys this random access success response message within or as a transmission referred to as MsgB. In one or more embodiment, for instance, the random access success response message is included in a medium access control (MAC) protocol data unit (PDU). In some embodiments, the random access success response message includes a contention resolution identity, a cell radio network temporary identity (C-RNTI), a timing advance (TA) command, an uplink grant, and/or a random access preamble identifier (RAPID). Note though that MsgB may contain responses to multiple wireless communication devices, with different kinds of information for different wireless communication devices depending on the outcome of the MsgA transmission/reception.

Note that 2-step random access (RA) and 4-step RA may coexist in a cell. Such coexistence may be realized via use of separate RACH occasions (ROs) or via shared ROs. A RACH occasion is an occurrence in time and frequency of uplink transmission resources configured for transmission of PRACH preambles. With separate ROs, each RO is only configured for either 2-step RA or 4-step RA. With shared ROs, each RO is configured for both 2-step RA and 4-step RA, where the two RA types are distinguished by the PRACH preamble.

In some embodiments, all ROs support 4-step RA, while a subset of ROs are shared ROs that support both 4-step RA and 2-step RA. In a shared RO, random access preambles used for 4-step RA are referred to as 4-step preambles, 4-step RA preambles, or 4-step PRACH preambles, while the random access preambles used for 2-step RA are referred to as 2-step preambles, 2-step RA preambles, or 2-step PRACH preambles.

In some embodiments, the wireless communication device 12 selects 2-step RA if the wireless communication device's perceived channel quality (e.g., measured RSRP) is above a configured threshold. This threshold may be referred to as "rsrp-ThresholdTwoStepRA" or just "rsrp-Threshold".

In some embodiments, the wireless communication network 10 can configure a maximum number of 2-step RA attempts the wireless communication device 12 can perform before concluding that the 2-step RA has failed. When that happens, the wireless communication device 12 in some embodiments may switch to 4-step RA (provided that 4-step RA resources are configured in the cell) and attempt to access the network 10 using 4-step RA.

Note that in this context there is a distinction between fallback to 4-step RA and switching to 4-step RA, where the former is triggered by a fallbackRAR MAC subPDU in msgB, while the latter is performed by the wireless communication device 12 after failing to access the network using 2-step RA.

In 4-step RA, preambles may be groups to allow for the wireless communication device 12 to signal to the radio network node 14 that the wireless communication device 12 desires to be scheduled with a larger than normal uplink grant. In 2-step RA, the msgA PUSCH is already pre-configured and is not "scheduled." This means that, in 2-step RA, there may be a pre-configured association between a preamble group and the msgA PUSCH configuration.

In some embodiments, an SSB comprises one or more synchronization signals that may include for instance a Primary Synchronization Signal (PSS) and a Secondary Synchronization Signal (SSS). In this case, the PSS provides subframe, slot, and symbol synchronization and the SSS provides radio frame synchronization. An SSB may also comprise a broadcast channel such as a Physical Broadcast Channel (PBCH) that conveys system information, e.g., in the form of a Master Information Block (MIB) that indicates essential system parameters such as system bandwidth, system frame number, and acknowledgement channel information. Correspondingly, an SSB in some embodiments may be interchangeably referred to as a synchronization signal (SS)/PBCH block.

Where the wireless communication network 10 is a 5G network, for instance, an SSB may comprise a block of 4 consecutive Orthogonal Frequency Division Multiplexing (OFDM) symbols. In some embodiments in this 5G context, the wireless communication device 12 may use an SSB for cell search. During cell search, a wireless communication device (also referred to as a user equipment, UE) aims at acquiring time and frequency synchronization with a cell and to detect a physical layer cell ID (PCI) of the cell. In NR embodiments, the synchronization signal block (SS block or SSB) consists of primary and secondary synchronization signals (PSS and SSS) and physical broadcast channel (PBCH). During the initial cell search, the UE first aims at detecting PSS and then SSS. Time and frequency synchronization as well as cell ID detection are done using PSS and SSS. Proper detection of PSS and SSS is a prerequisite step for PBCH demodulation. PBCH carries basic system information such as master information block (MIB) and determines essential parameters for initial access of the cell including the downlink system bandwidth and the system frame number. For PBCH, polar coding and QPSK modulation are used. The SSB periodicity can be {5, 10, 20, 40, 80, 160} ms, configured via RRC parameters. However, a default periodicity of 20 ms is assumed during initial cell search in some embodiments.

Figure 6:
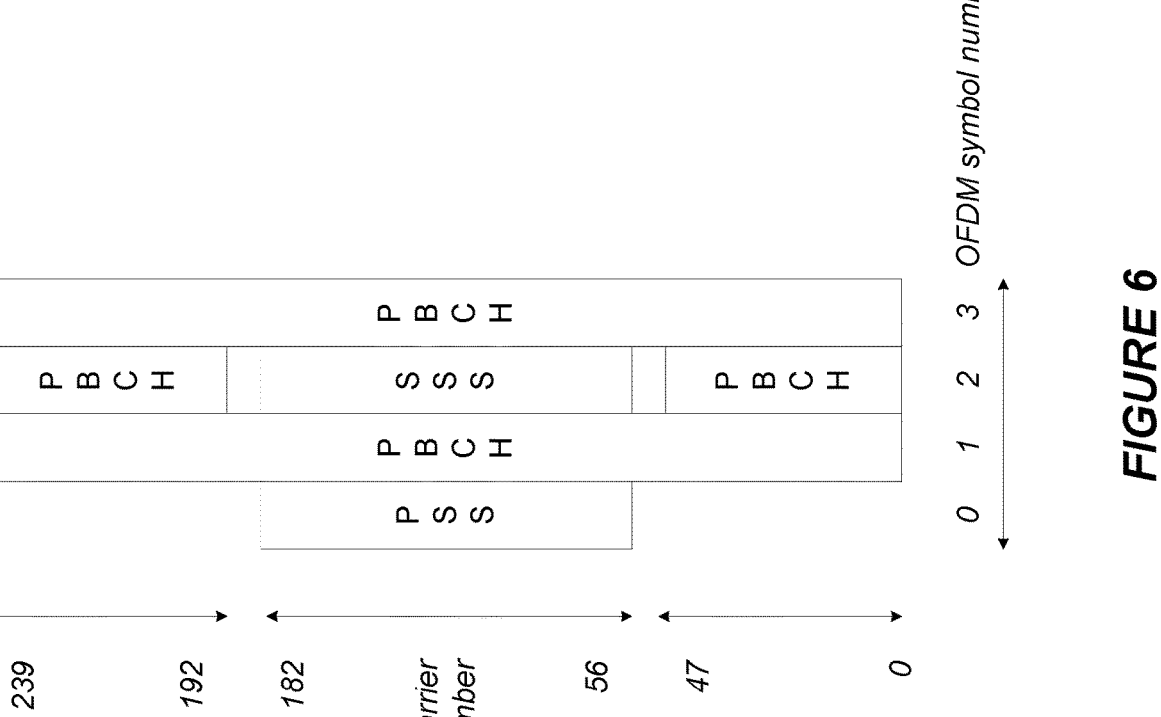
FIG. 6 is a block diagram of an SSB according to some embodiments.

In the frequency domain, one SSB according to some embodiments occupies 20 contiguous resource blocks which is equivalent to 240 subcarriers, as illustrated in FIG. 6. In the time domain, one SSB according to some embodiments spans over 4 OFDM symbols. Among the four symbols, one symbol is for PSS, one symbol is for SSS, and 2 symbols are for PBCH. Specifically, PSS occupies the first OFDM symbol of the SSB and spans over 127 subcarriers. SSS is located in the third OFDM symbol of the SSB and spans over 127 subcarriers. The total number of resource elements (REs) used for PBCH transmission per SSB is 576 according to some embodiments. There are, however, 113 unused subcarriers in the first symbol, and 17 unused subcarriers in the thirds symbol, in the embodiment of FIG. 6. The complex-valued symbols corresponding to these unused REs may be set to zero.

In any event, in some embodiments where the wireless communication device 12 needs to indicate a preferred SSB to the radio network node 14 as part of contention-based random access, the wireless communication device 12 measures one or more SSBs 16-1 . . . 16-N in terms of an SSB RSRP and compares the SSB RSRP(s) to a threshold, e.g., rsrp-ThresholdSSB. If at least one of the SSBs with SSB RSRP above the threshold is available, the wireless communication device 12 selects an SSB with SSB RSRP above the threshold. Otherwise, the wireless communication device 12 selects any SSB. Once the SSB has been selected, the wireless communication device 12 indicates the selected SSB to the radio network node 14 by selection of a random access preamble and/or PRACH occasion (RO) depending on the configuration. With the use of specific preambles and/or RO, the UE implicitly indicates the selected SSB to the radio network node 14. This lets the radio network node 14 know which direction to transmit the RAR and subsequent messages.

Note that, in the case of CFRA where resources can be assigned to wireless communication devices in RRC connected mode, SSBs are indicated either by ROs or preambles. In LTE, only one preamble needs to be dedicated to give CFRA resources to a wireless communication device, while in NR the number of preambles is equal to the number of SSBs that need to be indicated per RO. Some embodiments exploit the fact that, since a wireless communication device is in connected mode in this case, beam management algorithms ensure that the radio network node in many cases already knows which beam is best for the wireless communication device.

Figure 7:
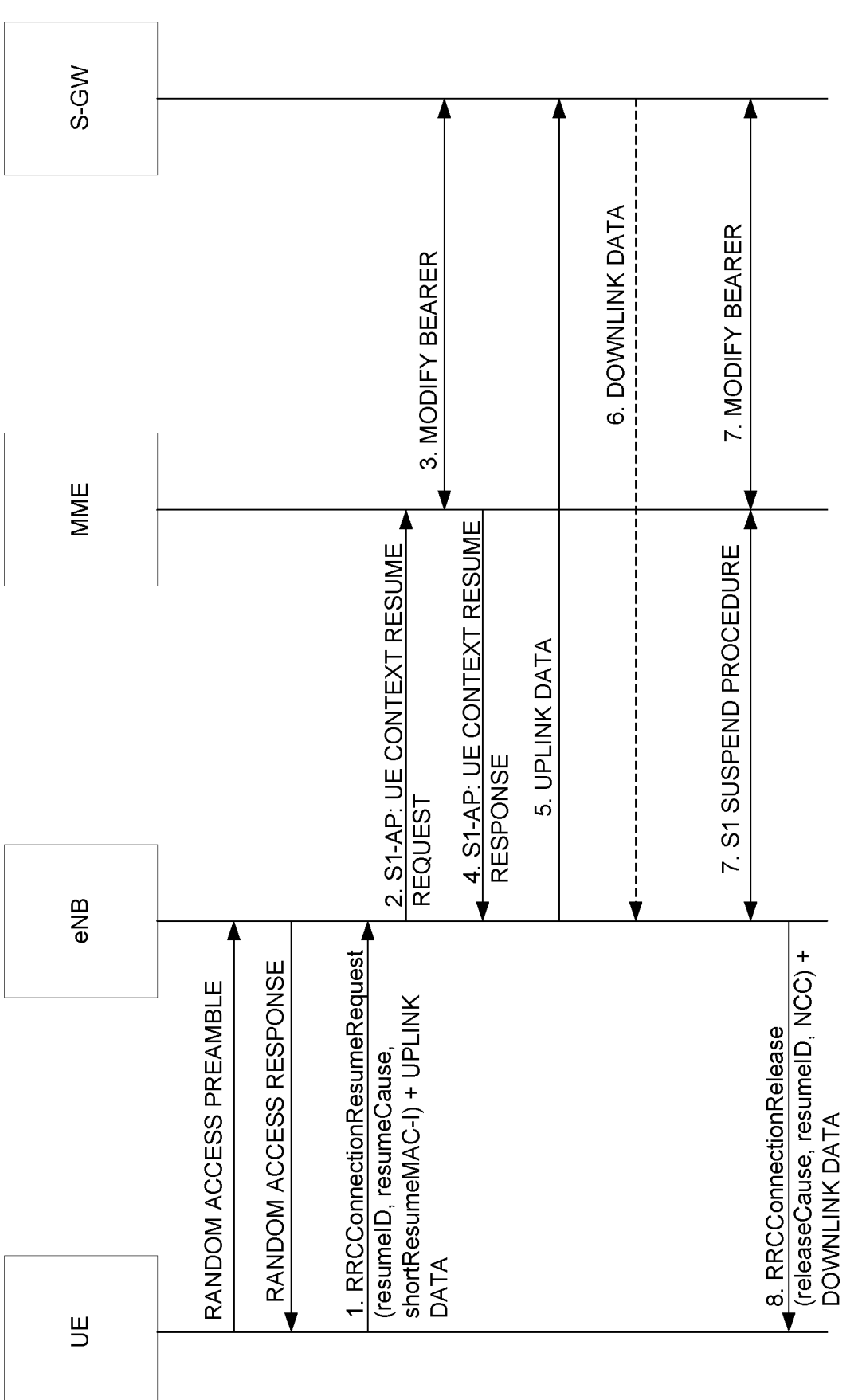
FIG. 7 is a call flow diagram of early data transmission (EDT) according to some embodiments.

Some embodiments also exploit Early Data Transmission (EDT), e.g., as of LTE Rel 15. The EDT procedure is designed for small, infrequent data transmissions and allows transmission of user plane (UP) data in the RA procedure, e.g., in msg3 for Idle wireless communication devices. The EDT procedure uses the RRC Resume procedure to establish security of the data bearers that carry the UP data and msg4 from the radio network node can do a RRC Suspend to keep the wireless communication device in Idle mode. FIG. 7 shows a procedure for EDT according to some embodiments in a context where the wireless communication device 12 is a user equipment (UE) and the radio network node 14 is an eNB.

0. Upon connection resumption request for Mobile Originated data from the upper layers, the UE initiates the early data transmission procedure and selects a random access preamble configured for EDT. The UE may for example select a random access preamble from a set 20 of random access preamble(s) that is not associated with any SSB.

1. The UE sends an RRCConnectionResumeRequest to the eNB, including its Resume ID, the establishment cause, and an authentication token. The UE resumes all signaling radio bearers (SRBs) and data radio bearers (DRBs), derives new security keys using the NextHop-ChainingCount provided in the RRCConnectionRelease message of the previous connection and re-establishes the access stratum (AS) security. The user data are ciphered and transmitted on the Downlink Data Channel (DTCH) multiplexed with the RRCConnectionResumeRequest message on the Common Control Channel (CCCH).

2. The eNB initiates the S1-AP Context Resume procedure to resume the S1 connection and re-activate the S1-U bearers.

3. The Mobility Management Entity (MME) requests the Serving Gateway (S-GW) to re-activate the S1-U bearers for the UE.

4. The MME confirms the UE context resumption to the eNB.

5. The uplink data are delivered to the S-GW.

6. If downlink data are available, the S-GW sends the downlink data to the eNB.

7. If no further data are expected from the S-GW, the eNB can initiate the suspension of the S1 connection and the deactivation of the S1-U bearers.

8. The eNB sends the RRCConnectionRelease message to keep the UE in RRC_IDLE. The message includes the releaseCause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.

Note that, if the MME or eNB decides the UE to move in RRC CONNECTED mode, RRCConnectionResume message is sent in step 7 to fall back to the RRC Connection resume procedure. In that case, the RRCConnectionResume message is integrity protected and ciphered with the keys derived in step 1 and the UE ignores the NextHopChainingCount included in the RRCConnectionResume message. Downlink data can be transmitted on DTCH multiplexed with the RRCConnectionResume message. In addition, an RRCConnectionSetup can also be sent in step 7 to fall back to the RRC Connection establishment procedure.

In some embodiments, 2-step RA can be used for EDT. In one or more such embodiments:

0. PRACH and PUSCH resources are configured specifically for EDT using 2-step RA 1. UE uses configured resources to transmit RRC resume and UP data in msgA PUSCH 2. gNB responds with RRC suspend which keeps the UE in RRC inactive.

Some embodiments herein address challenges in these and other contexts, where for instance the PRACH and preamble resources would be easily exhausted when the number of SSBs is large, since all preambles would heretofore need to be split between SSBs/SSB groups. Indeed if all preambles were to be split between SSBs/SSB groups, the gNB would always need to configure more resources for preambles and PRACH occasions if the number of SSBs increases.

To address the above described problem of preamble resource utilization, the PRACH configuration (e.g., for 2-step RA) according to some embodiments does not include any PRACH/Preamble to SSB mapping. Instead the wireless communication device 12 does not need to indicate an SSB. Therefore a SSB to preamble mapping is not used for a set of preambles. Equivalently, the wireless communication device 12 may just indicate a dummy SSB which is not mapped to any of the multiple beams.

This is possible in many cases since the SSB indication is not needed in some cases such as for EDT or CFRA. In some embodiments, the radio network node 14 will rely on reciprocity and estimate which direction to transmit msgB, e.g., using a wide beam or by knowledge of the wireless communication device's preferred beam (e.g., in CFRA scenarios). Yet another option is that the radio network node 14 transmits the random access response in multiple beams.

Some embodiments are particularly suited to EDT using 2-step RA. The reason for this is that the 2-step EDT often ends with msgB and as long as this message can be received, it is not important if the exact right downlink beam is used for msgB. Hence, the importance of indicating SSB can be less for EDT than for 2/4-step RA procedures triggered for e.g. initial access where subsequent messages will follow and usage of a suboptimal downlink beam would trigger beam management operations. Another situation is for 2-step CFRA, where the radio network node 14 may already know which beam is preferred by the wireless communication device 12 or be indicated in msgA since no timing advance is needed for the msgA transmission.

Generally, then, some embodiments remove the mapping between SSB and preambles in cases where this is not needed, in order to free up preambles for other purposes.

Certain embodiments may provide one or more of the following technical advantage(s). In scenarios where preambles are scarce, e.g. where 2-step RA and 4-step RA share ROs and several SSBs are mapped to each RO, some embodiments free up preambles by removing the SSB to preamble mapping. This will allow configuration of more preambles to both CBRA (both preamble group A and preamble group B for both 2-step and 4-step) and CFRA which allows more diverse RACH configurations and support of higher RACH load since preamble collision probability will be reduced. Some embodiments thereby reduce the preamble occupation/usage which is beneficial especially for a cell/BWP/channel/carrier which has high RACH load.

Alternatively or additionally, some embodiments allow the use of more beams without increasing the overhead for preambles and PRACHs. Indeed, some embodiments herein avoid large overhead in terms of PRACH resources when there is a large number of beams (and SSBs), such as in embodiments where EDT for 2-step RA is added on top of the 2-step RA without EDT. This way, there is a sufficient number of preambles available for each preamble group even when there is a large number of SSBs.

Alternatively or additionally, some embodiments avoid increased latency in these scenarios where there is a large number of beams (and SSBs). Some embodiments in this regard reduce the number of PRACH occasions needed for indicating a preferred SSB.

Consider now specific examples for the control signaling 17 in FIG. 1, described in an example 5G context. In these specific examples, the term "SSB-preamble-mapping-free" represents embodiments herein where a set of preambles is not mapped to any SSB.

In one specific example, in a cell, BWP, channel, or carrier, at least one first PRACH configuration which does not include any PRACH/Preamble to SSB mapping for a set of preambles is configured, although the cell, BWP, channel, or carrier may transmit multiple SSBs. Instead, the wireless communication device 12 indicates no SSB at all. Meanwhile, there may be also at least one second PRACH configuration (or a different part of the first PRACH configuration) with "SSB-preamble mapping" (i.e., the configuration as in NR Rel-15/Rel-16). There may be multiple purposes/usages for the first PRACH configuration. One purpose may be to reduce the usage of preambles. Another purpose may be to achieve latency reduction and still have preambles enough for flexible configurations.

In some embodiments in this first example, only a set of preamble indexes are configured as SSB-preamble-mapping-free for one or more concerned services such as EDT, e.g., belonging to a subset of the preamble range defined for CFRA. In case a wireless communication device has triggered a RA for the concerned services, the wireless communication device initiates the RA according to this first PRACH configuration. In this PRACH configuration, for SSBs mapped to a RO, there is no mapping relation between SSBs and preamble indices. In other words, for a CBRA triggered for EDT, the wireless communication device can select any preamble out of a set from the CFRA preambles. In case the RA is triggered for some other service (non-EDT), the wireless communication device uses the legacy configured mapping between SSBs and CBRA preambles.

In some embodiments, this is implemented in RRC by introducing three new fields to an RRC message. An ssb-perRACH-Occasion-SSB-preamble-mapping-free field indicates the number of SSBs that are mapped to each RO. In case this number is greater than one, selection of this RO indicates that one of the SSBs mapped to this RO is selected. A number-of-mapping-free preambles field Indicates how many preambles are available per RO. This field is only used for CBRA, otherwise it is set to 1. A mapping-free-start-index field indicates a starting index of the mapping free preambles. Starting from this index, number-of-mapping-free preambles are used for mapping free CBRA. For CFRA, this is the preamble index.

The fields in some embodiments are included in RACH-ConfigCommonTwoStepRA or RACH-ConfigDedicated.

Another example of how this is implemented in RRC according to some embodiments is illustrated as the below to clarify the potential changes to the RRC.

```
-- ASN1START
-- TAG-RACH-CONFIGCOMMON-START
RACH-ConfigCommon ::=              SEQUENCE {
    rach-ConfigGeneric                RACH-ConfigGeneric,
    totalNumberOfRA-Preambles         INTEGER (1..63)      OPTIONAL,   -- Need S
    ssb-perRACH-OccasionAndCB-PreamblesPerSSB CHOICE {
        oneEighth         ENUMERATED
{n4,n8,n12,n16,n20,n24,n28,n32,n36,n40,n44,n48,n52,n56,n60,n64},
        oneFourth         ENUMERATED
{n4,n8,n12,n16,n20,n24,n28,n32,n36,n40,n44,n48,n52,n56,n60,n64},
        oneHalf           ENUMERATED
{n4,n8,n12,n16,n20,n24,n28,n32,n36,n40,n44,n48,n52,n56,n60,n64},
        one               ENUMERATED
{n4,n8,n12,n16,n20,n24,n28,n32,n36,n40,n44,n48,n52,n56,n60,n64},
        two               ENUMERATED {n4,n8,n12,n16,n20,n24,n28,n32},
        four                         INTEGER (1..16),
        eight                        INTEGER (1..8),
        sixteen                      INTEGER (1..4)
    }                                OPTIONAL,   -- Need M Need N
    groupBconfigured              SEQUENCE {
        ra-Msg3SizeGroupA                ENUMERATED {b56, b144, b208, b256,
b282, b480, b640, b800, b1000, b72, spare6, spare5,spare4, spare3, spare2, spare1},
        messagePowerOffsetGroupB         ENUMERATED { minusinfinity, dB0, dB5,
dB8, dB10, dB12, dB15, dB18},
        numberOfRA-PreamblesGroupA       INTEGER (1..64)
    }                                OPTIONAL,   -- Need R
    ra-ContentionResolutionTimer         ENUMERATED { sf8, sf16, sf24,
sf32, sf40, sf48, sf56, sf64},
    rsrp-ThresholdSSB             RSRP-Range             OPTIONAL,   -- Need R
    rsrp-ThresholdSSB-SUL         RSRP-Range             OPTIONAL,   -- Cond SUL
    prach-RootSequenceIndex       CHOICE {
        1839                         INTEGER (0..837),
        1139                         INTEGER (0..137)
    },
    msg1-SubcarrierSpacing        SubcarrierSpacing  OPTIONAL,   -- Cond L139
    restrictedSetConfig           ENUMERATED {unrestrictedSet,
restrictedSetTypeA, strictedSetTypeB},
    msg3-transformPrecoder        ENUMERATED {enabled}      OPTIONAL,   --
Need R
    ...,
    [[
    ra-PrioritizationForAccessIdentity          SEQUENCE {
        ra-Prioritization-r16                       RA-Prioritization,
        ra-PrioritizationForAI-r16                  BIT STRING (SIZE (2))
    }                                OPTIONAL,   -- Need R
    prach-RootSequenceIndex-r16          CHOICE {
```

-continued

```
        1571                          INTEGER (0..569),
        11151                         INTEGER (0..1149)
    } OPTIONAL    -- Need R
]],
    [[
    ssb-perRACH-Occasion          ENUMERATED {oneEighth, oneFourth, oneHalf,
one, two, four, eight, sixteen} OPTIONAL, -- Cond SSB-preamble-mapping-free
    ]]
}
-- TAG-RACH-CONFIGCOMMON-STOP
-- ASN1STOP
```

| RACH-ConfigCommon field descriptions |
|---|
| None relevant fields are skipped |
| ssb-perRACH-Occasion |
| Number of SSBs per RACH occasion if |
| SSB-preamble-mapping-free is enabled. |

| Conditional Presence | Explanation |
|---|---|
| L139 | The field is mandatory present if prach-RootSequenceIndex L = 139, otherwise the field is absent, Need S. |
| SUL | The field is mandatory present in initialUplinkBWP in supplementaryUplink; otherwise, the field is absent. |
| SSB-preamble - mapping-free | The field is mandatory present if SSB-preamble-mapping-free is enabled, i.e., ssb-perRACH-OccasionAndCB-PreamblesPerSSB is absent; otherwise, the field is absent. |

In this example, the IE ssb-perRACH-OccasionAndCB-PreamblesPerSSB is absent to indicate the feature of SSB-preamble mapping free is enabled; otherwise, the feature is disabled. In order to allow the radio network node 14 to be able to reconfigure the feature for a PRACH configuration, the condition associated with the wireless communication device 12 needs to be updated from "Need M" to "Need N" or "Need R" (indicating that the previously received value is discarded). Such reconfiguration could be useful in case the radio network node 14 wants to reconfigure a PRACH configuration. The radio network node 14 can just send a RRC reconfiguration message to a wireless communication device or a group of wireless communication devices with the IE ssb-perRACH-OccasionAndCB-PreamblesPerSSB present or absent, to indicate whether the feature is disabled or enabled.

A new IE ssb-perRACH-Occasion is added therefore for configuring the mapping relation between SSBs and ROs in case SSB-preamble-mapping-free is configured. This is needed since SSBs or beams can be mapped to different ROs to achieve RACH load balance purpose.

In another example, the potential RRC changes for a CFRA configuration configured with the feature of SSB-preamble-mapping-free are highlighted below.

```
-- ASN1START
-- TAG-BEAMFAILURERECOVERYCONFIG-START
BeamFailureRecoveryConfigSSBPreambleMappingFree-r17 ::=          SEQUENCE {
    rootSequenceIndex-BFR     INTEGER (0..137)          OPTIONAL, -- Need M
    rach-ConfigBFR            RACH-ConfigGeneric       OPTIONAL, -- Need M
    rsrp-ThresholdSSB         RSRP-Range               OPTIONAL, -- Need M
    candidateBeamRSList       SEQUENCE (SIZE(1..maxNrofCandidateBeams)) OF
PRACH ResourceDedicatedBFR        OPTIONAL, -- Need M
    ssb-perRACH-Occasion          ENUMERATED {oneEighth, oneFourth, oneHalf,
one, two, four, eight, sixteen} OPTIONAL, -- Need M
    ra-ssb-OccasionMaskIndex          INTEGER (0..15)          OPTIONAL, -- Need M
    recoverySearchSpaceId             SearchSpaceId           OPTIONAL, -- Need R
    ra-Prioritization                 RA-Prioritization       OPTIONAL, -- Need R
    beamFailureRecoveryTimer          ENUMERATED {ms10, ms20, ms40, ms60,
ms80, ms100, ms150, ms200}        OPTIONAL, -- Need M
    ...,
    [[
    msg1-SubcarrierSpacing            SubcarrierSpacing       OPTIONAL -- Need M
    ]],
    [[
    ra-PrioritizationTwoStep-r16      RA-Prioritization       OPTIONAL, -- Need R
    candidateBeamRSListExt-r16                SEQUENCE
(SIZE(0..maxNrofCandidateBeamsExt-r16)) OF PRACH-ResourceDedicatedBFR
OPTIONAL -- Need
    ]],
    [[
    ra-PreambleIndex          INTEGER (0..63)  OPTIONAL,   -- Cond SSB-preamble
mapping free
    ]]
}
```

-continued

```
PRACH-ResourceDedicatedBFR ::=             CHOICE {
    ssb                                          BFR-SSB-Resource,
    csi-RS                                       BFR-CSIRS-Resource
}
BFR-SSB-Resource ::=          SEQUENCE {
    ssb                             SSB-Index,
    ...
}
BFR-CSIRS-Resource ::=        SEQUENCE {
    csi-RS                          NZP-CSI-RS-ResourceId,
    ra-OccasionList                 SEQUENCE (SIZE(1..maxRA-
OccasionsPerCSIRS)) OF INTEGER (0..maxRA-Occasions-1)   OPTIONAL,   -- Need R
    ...
}
-- TAG-BEAMFAILURERECOVERYCONFIG-STOP
-- ASN1STOP
```

BeamFailureRecoveryConfig field descriptions
None relevant fields are skipped.
ra-PreambleIndex
The preamble index that the UE shall use when
performing BFR upon selecting a candidate beam

| Conditional Presence | Explanation |
|---|---|
| SSB-preamble-mapping-free | The field is mandatory present if SSB-preamble-mapping-free is enabled, i.e., ssb-perRACH-OccasionAndCB-PreamblesPerSSB is absent in RACH-ConfigCommon; otherwise, the field is absent. |

In this example, a new information element (IE) BeamFailureRecoveryConfigSSBPreambleMappingFree-r17 is defined for configuring a beam failure recovery with SSB-preamble-mapping-free. The IE name with the suffix 'r17' is appended assuming the new feature is accepted in the 3GPP Rel-17. If the feature is accepted in a different 3GPP release, the suffix needs to be changed accordingly.

In the IE BeamFailureRecoveryConfigSSBPreambleMappingFree-r17, an IE ra-PreambleIndex is defined for configuring the preamble index for all SSB or CSI-RS resources configured for the BFR procedure. There is no mapping relation between this preamble index and those SSB or CSI-RS resources. In case the SSB-preamble mapping free feature is used for BFR, the radio network node 14 needs to deduce the best beam by other means than via preamble indication.

In some embodiments, a capability bit may be introduced for indicating whether or not a wireless communication device supports SSB-preamble-mapping-free' based PRACH.

In view of the above modifications and variations, FIG. 8 depicts a method performed by a wireless communication device 12 in accordance with particular embodiments. The method includes receiving, from a radio network node 14 configured to transmit multiple SSBs 16-1 . . . 16-N, a random access configuration 18 which configures the wireless communication device with 12 a set 20 of one or more random access preambles that is not associated with any of the multiple SSBS 16-1 . . . 16-N (Block 810).

In some embodiments, the random access configuration 18, or the set 20 of one or more random access preambles, is specific for a random access procedure that is of a certain type and/or for a certain type of service. For example, in some embodiments, the certain type of random access procedure is a two-step random access procedure in which a random access preamble and a payload are transmitted by the wireless communication device 12 in a first step and a random access response is received by the wireless communication device 12 in a second step occurring after the first step. In other embodiments, the certain type of random access procedure is a contention-free random access procedure. Alternatively or additionally, the certain type of service in some embodiments is an early data transmission service in which user data is transmitted during a random access procedure.

In some embodiments, other sets 22-1 . . . 22-N of one or more random access preambles are associated with different respective ones of the multiple SSBs 16-1 . . . 16-N. In one or more of these embodiments, each of the other sets 22-1 . . . 22-N includes different subsets of one or more random access preambles, with different subsets being specific for random access procedures that are of different respective types or for different respective types of services.

In some embodiments, the method further comprises performing a random access procedure with the radio network node 14 using a random access preamble from the set 20 of one or more random access preambles that is not associated with any of the multiple SSBS 16-1 . . . 16-N (Block 830). In some embodiments, this random access procedure is performed based on the random access procedure being of the certain type and/or for the certain type of service.

In some embodiments, the random access configuration includes one or more fields that indicate whether or not the set 20 of one or more random access preambles is associated with any of the multiple SSBs 16-1 . . . 16-N.

In some embodiments, the random access configuration 18 indicates the set 20 of one or more random access preambles that is not associated with any of the multiple SSBs 16-1 . . . 16-N. In one or more of these embodiments, available random access preambles have respective indices, and the random access configuration 18 indicates the set 20 one or more random access preambles via a first field that indicates a number of the one or more random access preambles and a second field that indicates a starting index. The one or more random access preambles comprise said number of the available random access preambles that are consecutively indexed starting from said starting index.

In some embodiments, the method further comprises enabling or disabling the random access configuration 18 (Block 820). This enabling or disabling may be based on at least one of any one or more of: whether a downlink signal measurement meets one or more signal measurement criteria; an amount of user data to be transmitted from the wireless communication device 12 to the radio network node 14 during a random access procedure; an expected interval of time between consecutive user data transmissions by the wireless communication device 12; latency and/or reliability requirements of a service for which random access is to be used; a random access channel load; and an event that triggered a random access procedure to be performed.

Although not shown, in some embodiments, the method further comprises attempting random access using the random access configuration 18, and, after random access using the random access configuration 18 fails a threshold number of times or fails to complete within a threshold duration, switching to attempting random access using a different random access configuration. This different random access configuration does not configure the wireless communication device 12 with a set of random access preambles that is not associated with any of the multiple SSBs.

In some embodiments, other sets 22-1 . . . 22-N of one or more random access preambles are associated with different respective ones of the multiple SSBs 16-1 . . . 16-N. In some embodiments, the method further comprises transmitting capability information that indicates whether or not the wireless communication device 12 supports a random access configuration which configures the wireless communication device 12 with a set of random access preambles that is not associated with any of the multiple SSBs 16-1 . . . 16-N (Block 800).

Although not shown, in some embodiments, the method further comprises selecting, from the one or more random access preambles indicated, a random access preamble to use for performing a random access procedure with the radio network node 14. The method may then comprise performing the random access procedure with the radio network node 14 using the selected random access preamble.

FIG. 9 depicts a method performed by a radio network node 14 in accordance with other particular embodiments. The method comprises transmitting multiple SSBs 16-1 . . . 16-N (Block 910). The method also comprises transmitting, from the radio network node 14 to a wireless communication device 12, a random access configuration 18 which configures the wireless communication device 12 with a set 20 of one or more random access preambles that is not associated with any of the multiple SSBs 16-1 . . . 16-N (Block 920).

In some embodiments, the random access configuration 18, or the set 20 of one or more random access preambles, is specific for a random access procedure that is of a certain type and/or for a certain type of service. For example, in some embodiments, the certain type of random access procedure is a two-step random access procedure in which a random access preamble and a payload are transmitted by the wireless communication device 12 in a first step and a random access response is received by the wireless communication device 12 in a second step occurring after the first step. In other embodiments, the certain type of random access procedure is a contention-free random access procedure. Alternatively or additionally, the certain type of service in some embodiments is an early data transmission service in which user data is transmitted during a random access procedure.

In some embodiments, other sets 22-1 . . . 22-N of one or more random access preambles are associated with different respective ones of the multiple SSBs 16-1 . . . 16-N. In one or more of these embodiments, each of the other sets 22-1 . . . 22-N includes different subsets of one or more random access preambles, with different subsets being specific for random access procedures that are of different respective types or for different respective types of services.

In some embodiments, the random access configuration 18 includes one or more fields that indicate whether or not the set of one or more random access preambles is associated with any of the multiple SSBs 16-1 . . . 16-N.

In some embodiments, the random access configuration 18 indicates the set 20 of one or more random access preambles that is not associated with any of the multiple SSBs 16-1 . . . 16-N. In one or more of these embodiments, available random access preambles have respective indices, and the random access configuration 18 indicates the set 20 one or more random access preambles via a first field that indicates a number of the one or more random access preambles and a second field that indicates a starting index. The one or more random access preambles comprise said number of the available random access preambles that are consecutively indexed starting from said starting index.

In some embodiments, the method further comprises enabling or disabling the random access configuration 18, or deciding whether or not to re-configure the random access configuration 18 (Block 930). This enabling, disabling, or deciding may be based on at least one of any one or more of: whether a downlink signal measurement meets one or more signal measurement criteria; an amount of user data to be transmitted from the wireless communication device 12 to the radio network node 14 during a random access procedure; an expected interval of time between consecutive user data transmissions by the wireless communication device 12; latency and/or reliability requirements of a service for which random access is to be used; a random access channel load; and an event that triggered a random access procedure to be performed.

In some embodiments, the method further comprises receiving a random access preamble from the wireless communication device 12 as part of a random access procedure (Block 940), determining which of multiple random access configurations the wireless communication device 12 used for the random access procedure (Block 950), and determining whether or not the received random access preamble is associated with one of the multiple SSBs 16-1 . . . 16-N, based on whether or not the determined random access configuration configures the wireless communication device 12 with a set 20 of random access preambles that is not associated with any of the multiple SSBs 16-1 . . . 16-N (Block 960).

Although not shown, in some embodiments, the method further comprises making a decision as to whether or not to configure the wireless communication device 12 with the random access configuration 18, wherein the decision is specific to the wireless communication device 12.

In some embodiments, other sets 22-1 . . . 22-N of one or more random access preambles that are associated with different respective ones of the multiple SSBs 16-1 . . . 16-N.

In some embodiments, the method further comprises receiving capability information that indicates whether or not the wireless communication device 12 supports a random access configuration 18 which configures the wireless communication device 12 with a set of random access preambles that is not associated with any of the multiple SSBs 16-1 . . . 16-N (Block 900).

In some embodiments, the method further comprises receiving, from the wireless communication device 12, as part of a random access procedure, a random access preamble included in the set 20. The method may further comprise transmitting, from the radio network node 14 to the wireless communication device 12, a random access response as a response to the random access preamble, by transmitting the random access response on one or more downlink beams that are estimated from measurement of an uplink beam or uplink signal from the wireless communication device 12 (Block 970).

Although not shown, in other embodiments, the method further comprises receiving, from the wireless communication device 12, as part of a random access procedure, a random access preamble included in the set 20. The method may further comprise transmitting, from the radio network node 14 to the wireless communication device 12, a random access response as a response to the random access preamble, by transmitting the random access response on a wide beam or an omnidirectional beam.

Embodiments herein also include corresponding apparatuses. Embodiments herein for instance include a wireless communication device 12 configured to perform any of the steps of any of the embodiments described above for the wireless communication device 12. Embodiments also include a wireless communication device 12 comprising processing circuitry and power supply circuitry. The processing circuitry is configured to perform any of the steps of any of the embodiments described above for the wireless communication device 12. The power supply circuitry is configured to supply power to the wireless communication device 12.

Embodiments further include a wireless communication device 12 comprising processing circuitry. The processing circuitry is configured to perform any of the steps of any of the embodiments described above for the wireless communication device 12. In some embodiments, the wireless communication device 12 further comprises communication circuitry.

Embodiments further include a wireless communication device 12 comprising processing circuitry and memory. The memory contains instructions executable by the processing circuitry whereby the wireless communication device 12 is configured to perform any of the steps of any of the embodiments described above for the wireless communication device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless communication device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 14 configured to perform any of the steps of any of the embodiments described above for the radio network node 14.

Embodiments also include a radio network node 14 comprising processing circuitry and power supply circuitry. The processing circuitry is configured to perform any of the steps of any of the embodiments described above for the radio network node 14. The power supply circuitry is configured to supply power to the radio network node 14.

Embodiments further include a radio network node 14 comprising processing circuitry. The processing circuitry is configured to perform any of the steps of any of the embodiments described above for the radio network node 14. In some embodiments, the radio network node 14 further comprises communication circuitry.

Embodiments further include a radio network node 14 comprising processing circuitry and memory. The memory contains instructions executable by the processing circuitry whereby the radio network node 14 is configured to perform any of the steps of any of the embodiments described above for the radio network node 14.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10:
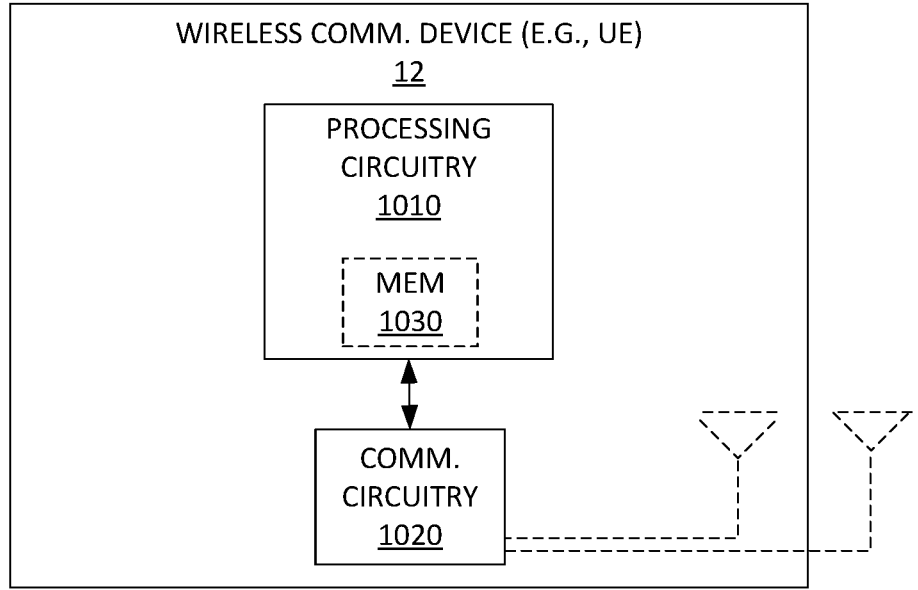
FIG. 10 is a block diagram of a wireless communication device according to some embodiments.

FIG. 10 for example illustrates a wireless communication device 12 as implemented in accordance with one or more embodiments. As shown, the wireless communication device 12 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the wireless communication device 12. The processing circuitry 1010 is configured to perform processing described above, such as by executing instructions stored in memory 1030. The processing circuitry 1010 in this regard may implement certain functional means, units, or modules.

Figure 11:
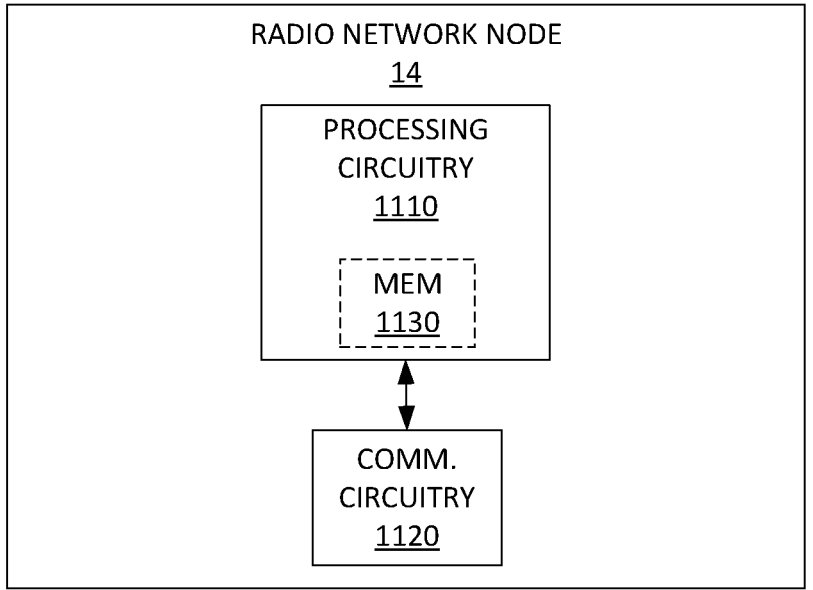
FIG. 11 is a block diagram of a radio network node according to some embodiments.

FIG. 11 illustrates a radio network node 14 as implemented in accordance with one or more embodiments. As shown, the radio network node 14 includes processing circuitry 1110 and communication circuitry 1120. The communication circuitry 1120 is configured to transmit and/or receive information to and/or from one or more other nodes, e.g., via any communication technology. The processing circuitry 1110 is configured to perform processing described above, such as by executing instructions stored in memory 1130. The processing circuitry 1110 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 12:
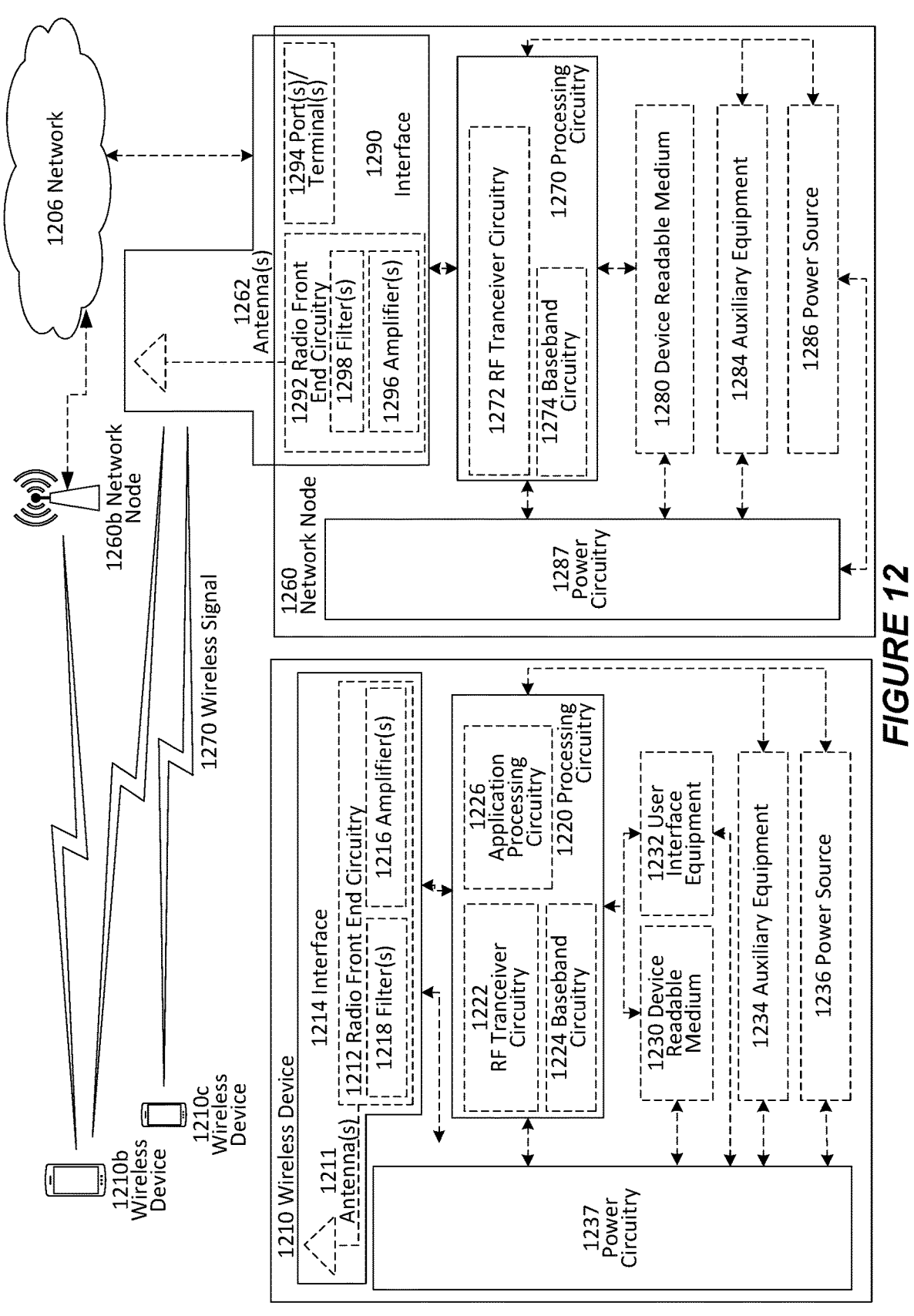
FIG. 12 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network may further include any additional elements suitable to support communication between wireless communication devices or between a wireless communication device and another communication device, such as a landline telephone, a service provider, or any other network node or end device. Of the illustrated components, network node 1260 and wireless communication device (WD) 1210 are depicted with additional detail. The wireless network may provide communication and other types of services to one or more wireless communication devices to facilitate the wireless communication devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless communication device functionality, such as providing wireless connections in a wireless network. In different embodiments, the wireless network may comprise any number of wired or wireless networks, network nodes, base stations, controllers, wireless communication devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless communication device and/or with other network nodes or equipment in the wireless network to enable and/or provide wireless access to the wireless communication device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless communication device with access to the wireless network or to provide some service to a wireless communication device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with base-band processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless communication device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless communication device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless communication device (WD) refers to a device capable, configured, arranged and/or operable to communicate wirelessly with network nodes and/or other wireless communication devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a prede-termined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a play-back appliance, a wearable terminal device, a wireless endpoint, a mobile station, a tablet, a laptop, a laptop-embedded equipment (LEE), a laptop-mounted equipment (LME), a smart device, a wireless customer-premise equip-ment (CPE). a vehicle-mounted wireless terminal device, etc. A WD may support device-to-device (D2D) communi-cation, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or mea-surements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless communication device 1210 includes antenna 1211, interface 1214, processing circuitry 1220, device readable medium 1230, user interface equip-ment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
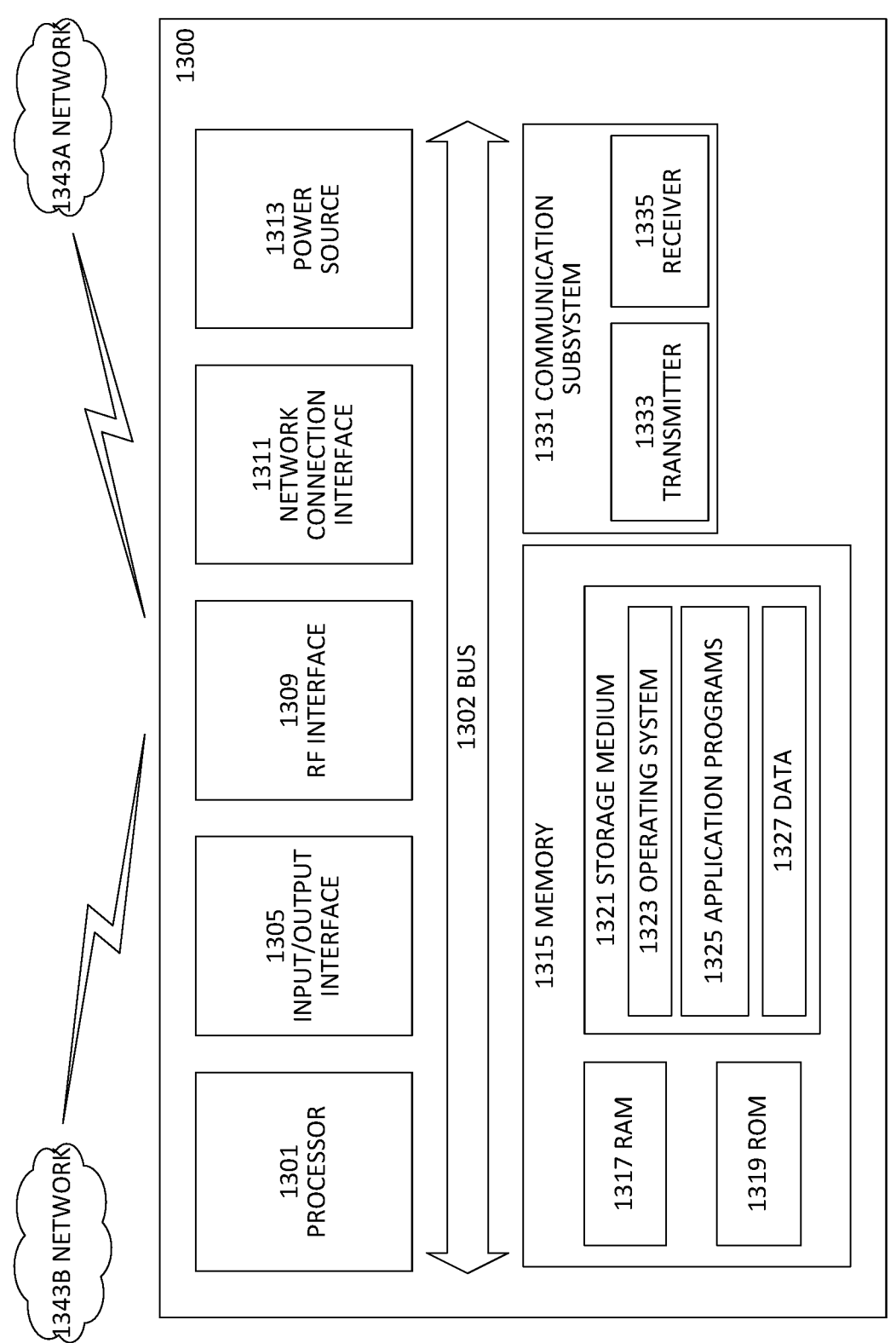
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343*b* may encompass wired and/or wireless networks such as a local-area network (LAN), a wide-area network (WAN), a computer network, a wireless network, a telecommunications network, another like network or any combination thereof. For example, network 1343*b* may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
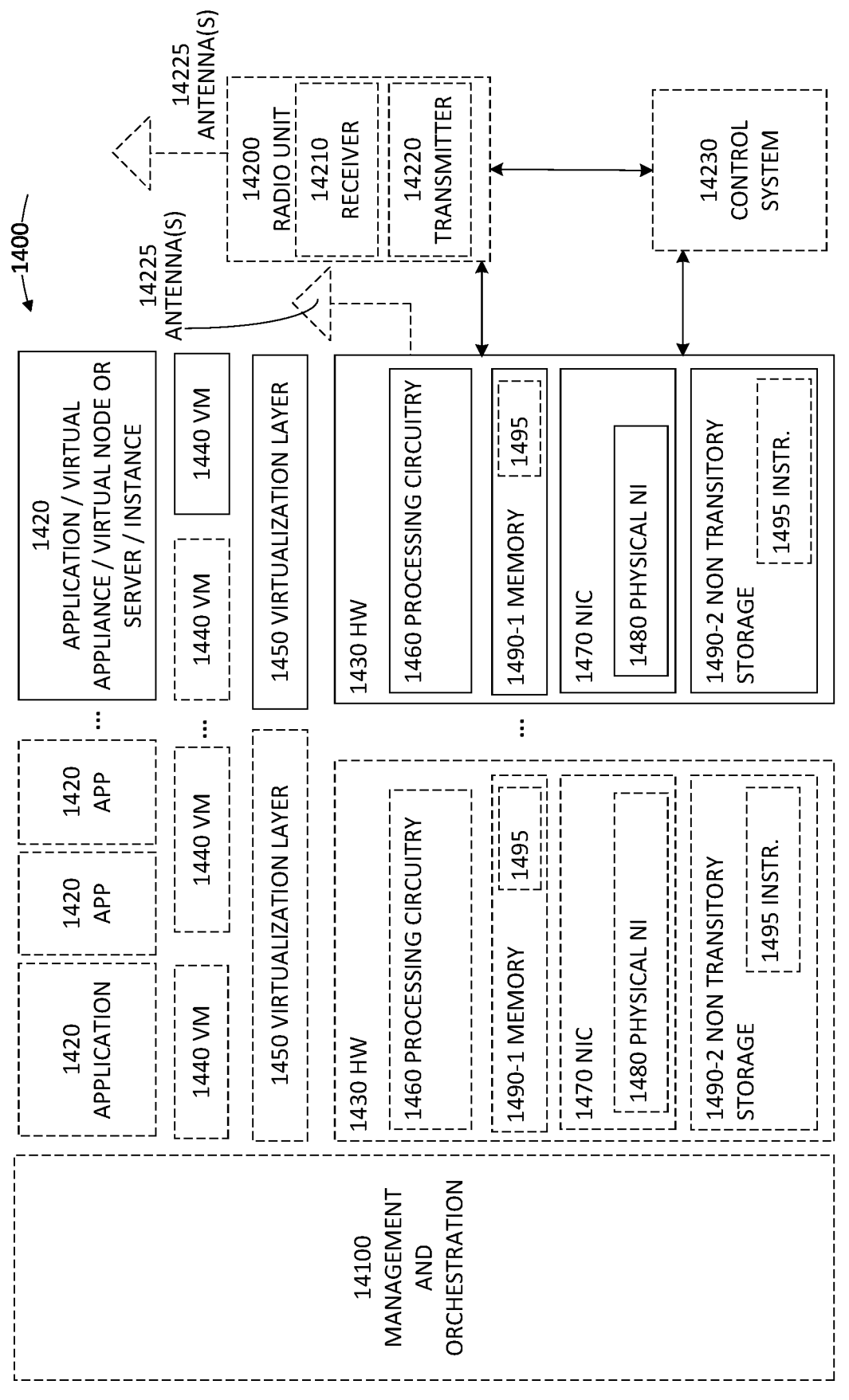
FIG. 14 is a block diagram of a virtualization environment according to some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless communication device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
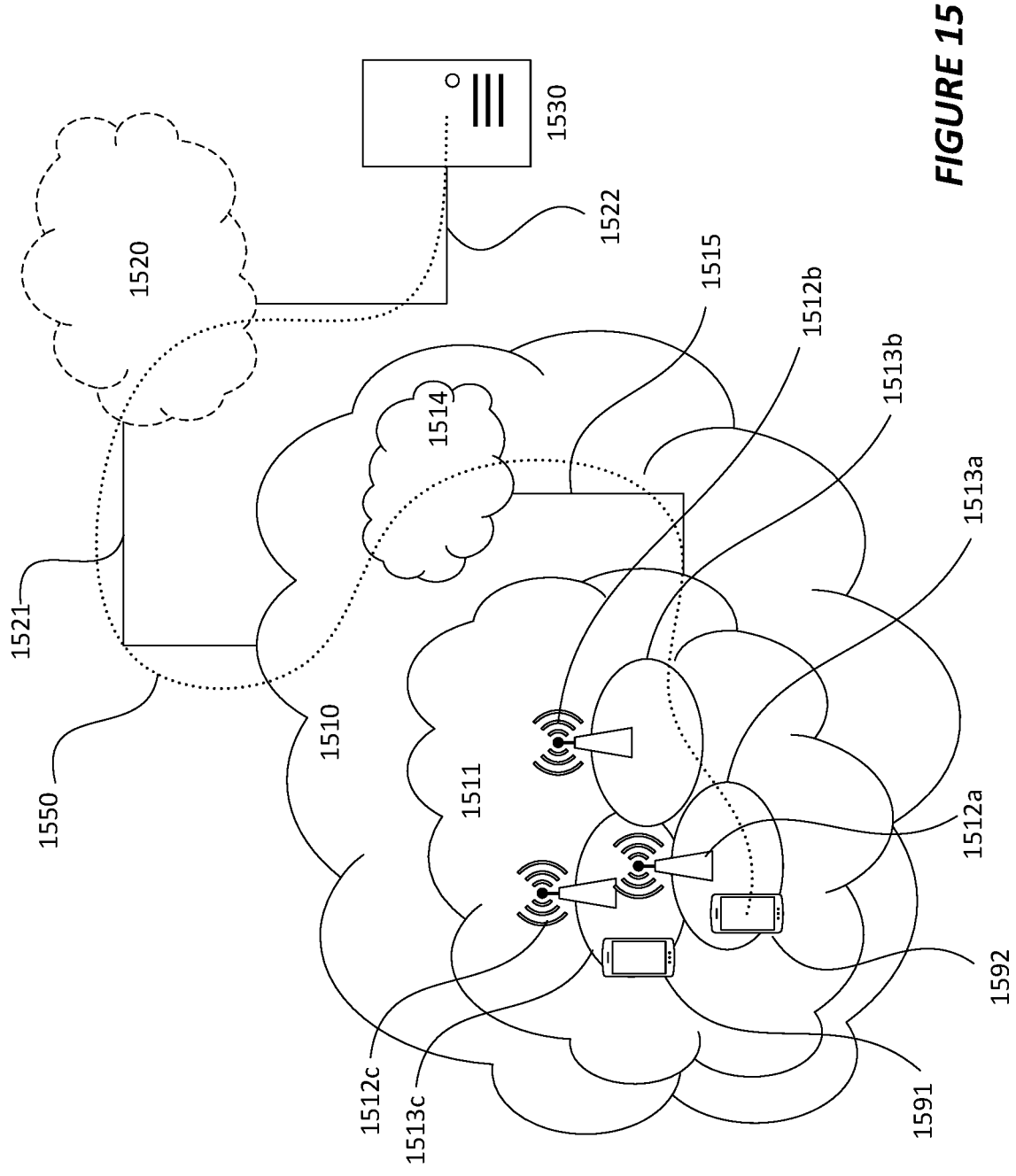
FIG. 15 is a block diagram of a communication network with a host computer according to some embodiments.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
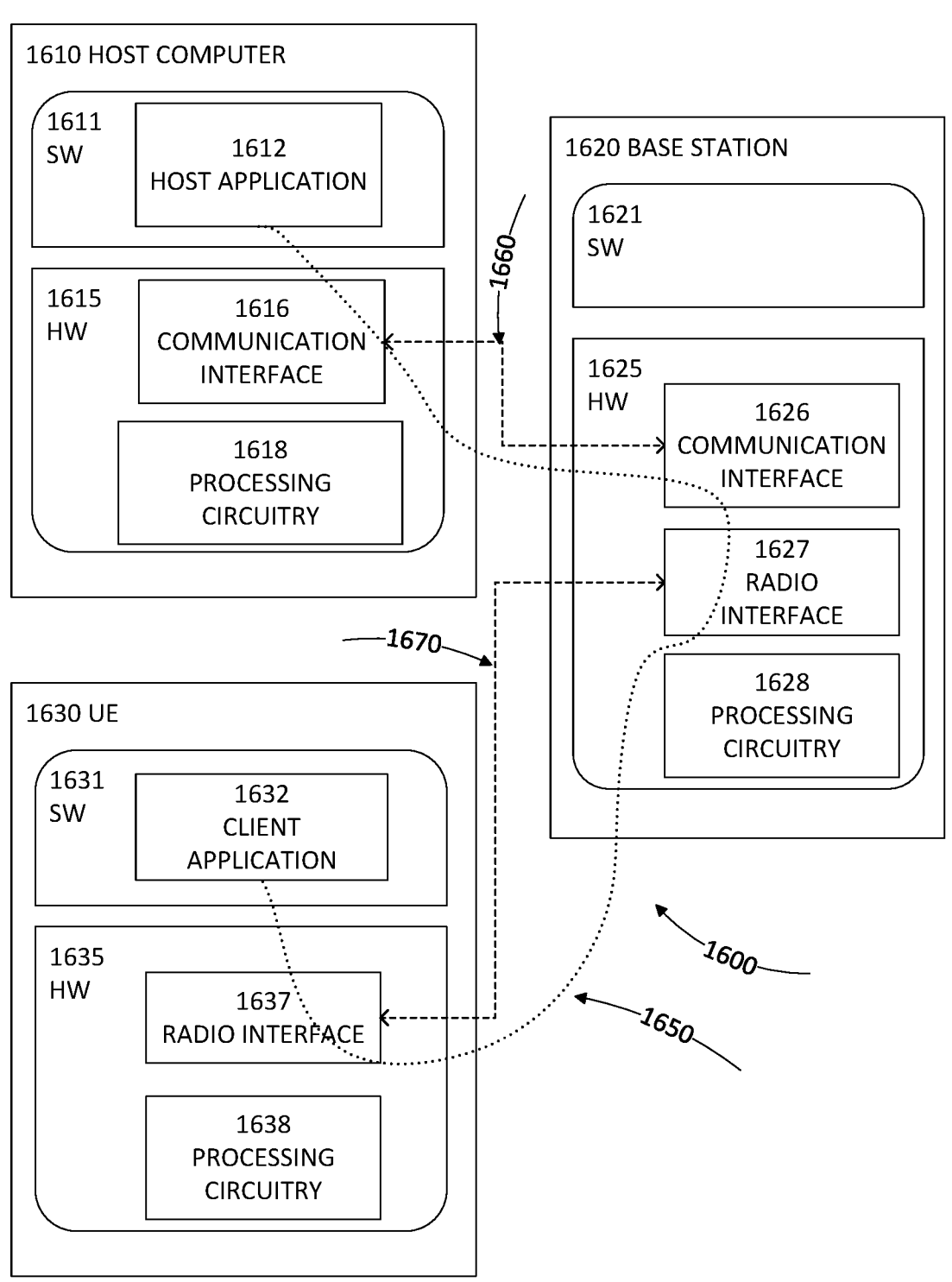
FIG. 16 is a block diagram of a host computer according to some embodiments.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
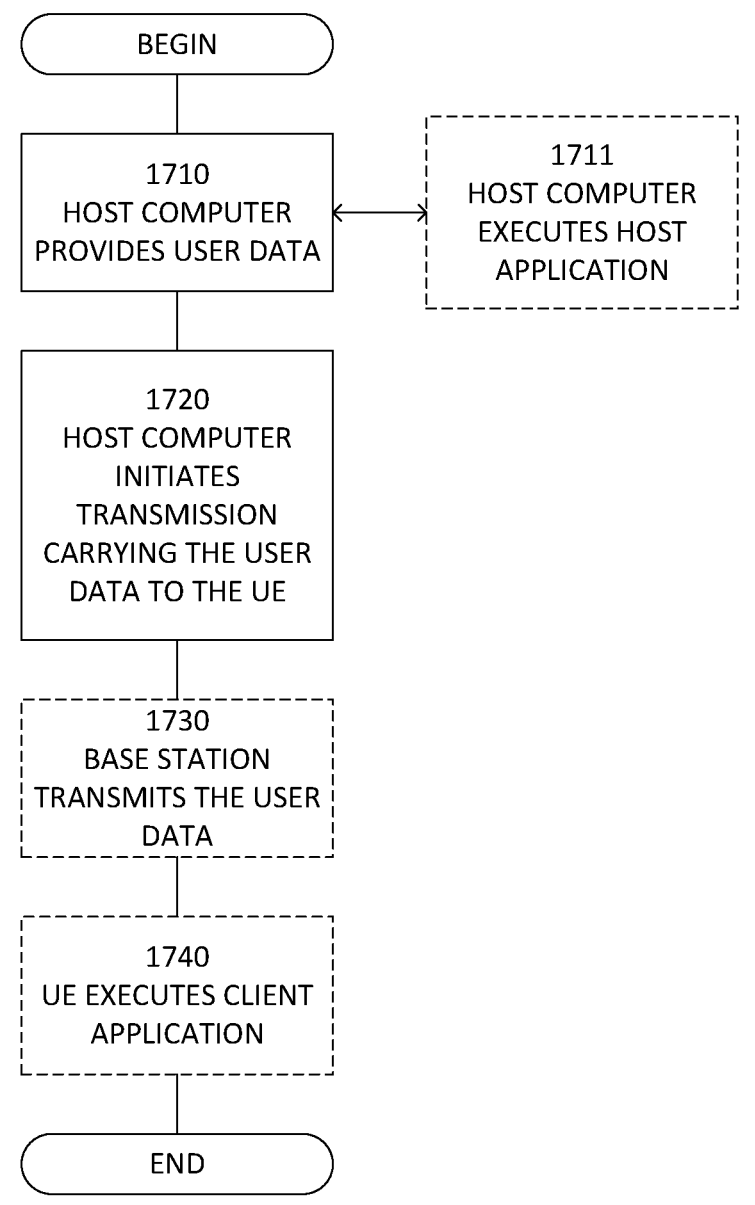
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
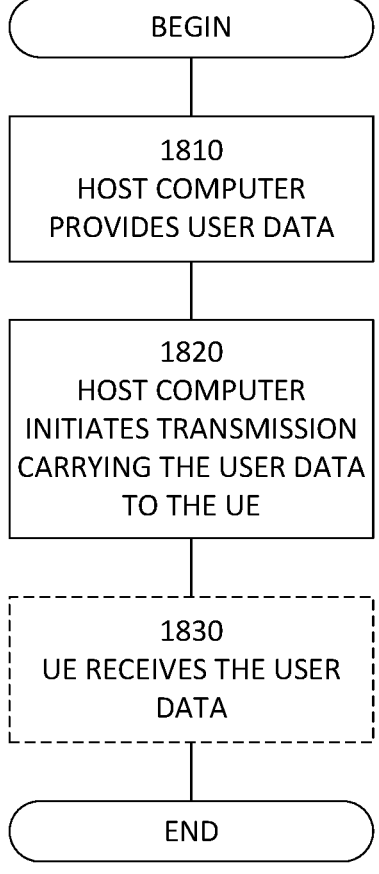
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
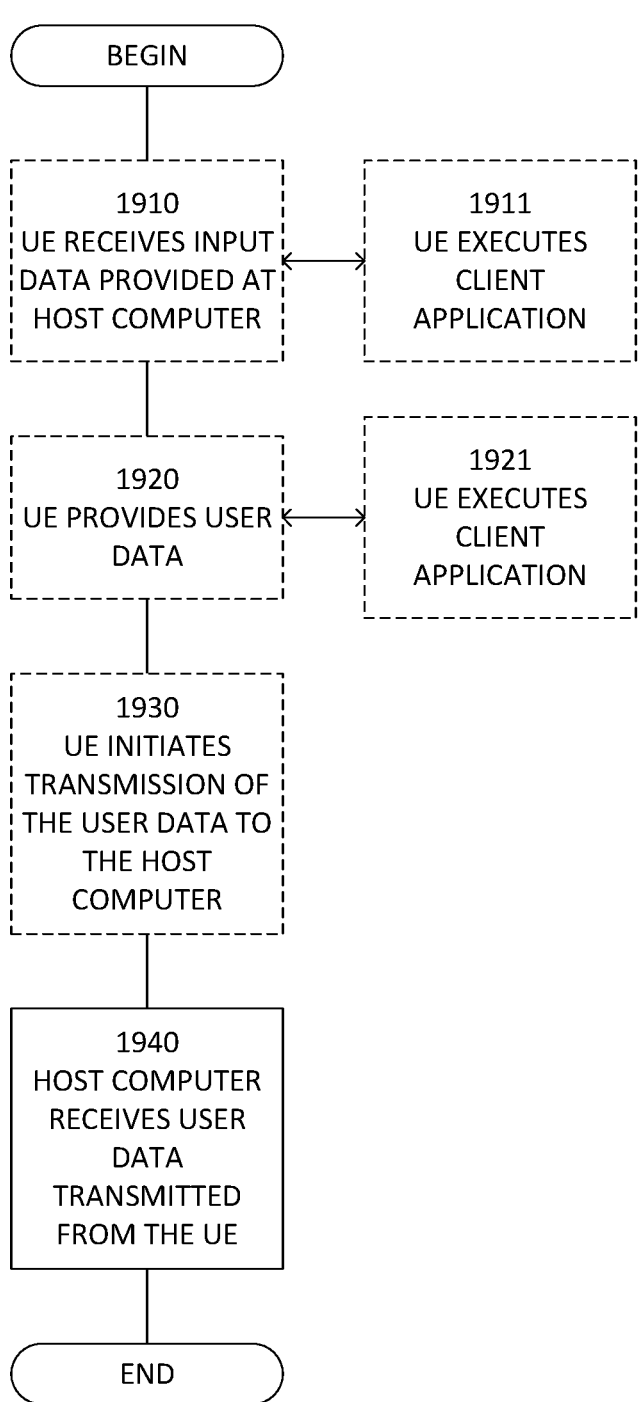
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional)

of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
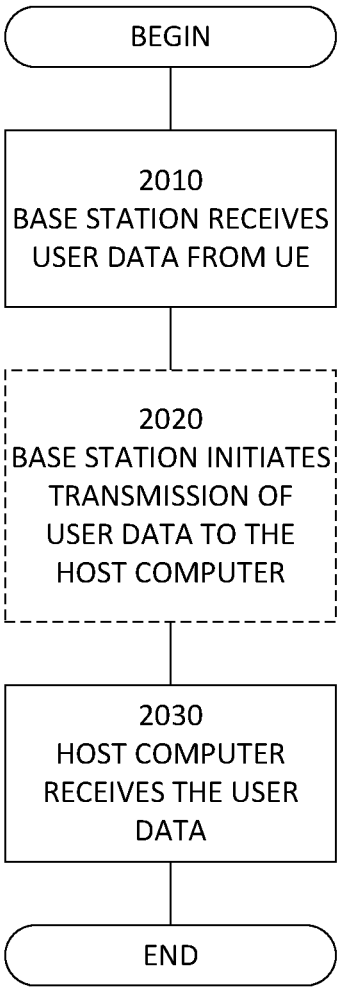
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE. In some embodiments the communication system further includes the UE.

In some embodiments, the communication system further including the base station.

In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless communication device, the method comprising:
    receiving, from a radio network node configured to transmit multiple synchronization and signal blocks (SSBs), a random access configuration which configures the wireless communication device with a set of one or more random access preambles that is not associated with any of the multiple SSBS, wherein the random access configuration indicates the set of one or more random access preambles that is not associated with any of the multiple SSBs,
wherein the random access configuration, or the set of one or more random access preambles, is specific for a random access procedure that is of a certain type and/or for a certain type of service, wherein the certain type of random access procedure is either:
    a two-step random access procedure in which a random access preamble and a payload are transmitted by the wireless communication device in a first step and a random access response is received by the wireless communication device in a second step occurring after the first step; or
    a contention-free random access procedure.

2. The method of claim 1, wherein the certain type of service is an early data transmission service in which user data is transmitted during a random access procedure.

3. The method of claim 1, wherein other sets of one or more random access preambles are associated with different respective ones of the multiple SSBs, wherein each of the other sets includes different subsets of one or more random access preambles, with different subsets being specific for random access procedures that are of different respective types or for different respective types of services.

4. The method of claim 1, further comprising performing a random access procedure with the radio network node using a random access preamble from the set of one or more random access preambles that is not associated with any of the multiple SSBS, based on the random access procedure being of the certain type and/or for the certain type of service.

5. The method of claim 1, wherein available random access preambles have respective indices, and wherein the random access configuration indicates the set one or more random access preambles via a first field that indicates a number of the one or more random access preambles and a second field that indicates a starting index, wherein the one or more random access preambles comprise said number of the available random access preambles that are consecutively indexed starting from said starting index.

6. The method of claim 1, further comprising enabling or disabling the random access configuration, based on at least one of any one or more of:
    whether a downlink signal measurement meets one or more signal measurement criteria;
    an amount of user data to be transmitted from the wireless communication device to the radio network node during a random access procedure;
    an expected interval of time between consecutive user data transmissions by the wireless communication device;
    latency and/or reliability requirements of a service for which random access is to be used;
    a random access channel load; and
    an event that triggered a random access procedure to be performed.

7. The method of claim 1, further comprising:
    selecting, from the one or more random access preambles indicated, a random access preamble to use for performing a random access procedure with the radio network node; and
    performing the random access procedure with the radio network node using the selected random access preamble.

8. A method performed by a radio network node, the method comprising:
    transmitting multiple synchronization and signal blocks (SSBs); and
    transmitting, from the radio network node to a wireless communication device, a random access configuration which configures the wireless communication device with a set of one or more random access preambles that is not associated with any of the multiple SSBs, wherein the random access configuration indicates the set of one or more random access preambles that is not associated with any of the multiple SSBs,
wherein the random access configuration, or the set of one or more random access preambles, is specific for a random access procedure that is of a certain type and/or for a certain type of service wherein the certain type of random access procedure is either:
    a two-step random access procedure in which a random access preamble and a payload are transmitted by the wireless communication device in a first step and a random access response is received by the wireless communication device in a second step occurring after the first step; or
    a contention-free random access procedure.

9. The method of claim 8, wherein the certain type of service is an early data transmission service in which user data is transmitted during a random access procedure.

10. The method of claim 8, wherein other sets of one or more random access preambles are associated with different respective ones of the multiple SSBs, wherein each of the other sets includes different subsets of one or more random access preambles, with different subsets being specific for random access procedures that are of different respective types or for different respective types of services.

11. The method of claim 8, wherein available random access preambles have respective indices, and wherein the random access configuration indicates the set one or more random access preambles via a first field that indicates a number of the one or more random access preambles and a second field that indicates a starting index, wherein the one or more random access preambles comprise said number of the available random access preambles that are consecutively indexed starting from said starting index.

12. The method of claim 8, further comprising enabling or disabling the random access configuration at the wireless communication device, or deciding whether or not to re-configure the random access configuration, based on at least one of any one or more of:

whether a downlink signal measurement meets one or more signal measurement criteria;

an amount of user data to be transmitted from the wireless communication device to the radio network node during a random access procedure;

an expected interval of time between consecutive user data transmissions by the wireless communication device;

latency and/or reliability requirements of a service for which random access is to be used;

a random access channel load; and an event that triggered a random access procedure to be performed.

13. The method of claim 8, further comprising:

receiving a random access preamble from the wireless communication device as part of a random access procedure;

determining which of multiple random access configurations the wireless communication device used for the random access procedure; and determining whether or not the received random access preamble is associated with one of the multiple SSBs, based on whether or not the determined random access configuration configures the wireless communication device with a set of random access preambles that is not associated with any of the multiple SSBs.

14. The method of claim 8, further comprising:

receiving, from the wireless communication device, as part of a random access procedure, a random access preamble included in the set; and transmitting, from the radio network node to the wireless communication device, a random access response as a response to the random access preamble, by transmitting the random access response on one or more downlink beams that are estimated from measurement of an uplink beam or uplink signal from the wireless communication device.

15. The method of claim 8, further comprising:

receiving, from the wireless communication device, as part of a random access procedure, a random access preamble included in the set; and transmitting, from the radio network node to the wireless communication device, a random access response as a response to the random access preamble, by transmitting the random access response on a wide beam or an omnidirectional beam.

16. A wireless communication device comprising:

communication circuitry; and processing circuitry configured to receive, via the communication circuitry, from a radio network node configured to transmit multiple synchronization and signal blocks (SSBs), a random access configuration which configures the wireless communication device with a set of one or more random access preambles that is not associated with any of the multiple SSBS, wherein the random access configuration indicates the set of one or more random access preambles that is not associated with any of the multiple SSBs, wherein the random access configuration, or the set of one or more random access preambles, is specific for a random access procedure that is of a certain type and/or for a certain type of service, wherein the certain type of random access procedure is either:

a two-step random access procedure in which a random access preamble and a payload are transmitted by the wireless communication device in a first step and a random access response is received by the wireless communication device in a second step occurring after the first step; or a contention-free random access procedure.

17. A radio network node comprising:

communication circuitry; and processing circuitry configured to, via the communication circuitry:

transmit multiple synchronization and signal blocks (SSBs); and transmit, from the radio network node to a wireless communication device, a random access configuration which configures the wireless communication device with a set of one or more random access preambles that is not associated with any of the multiple SSBs, wherein the random access configuration indicates the set of one or more random access preambles that is not associated with any of the multiple SSBs, wherein the random access configuration, or the set of one or more random access preambles, is specific for a random access procedure that is of a certain type and/or for a certain type of service, wherein the certain type of random access procedure is either:

a two-step random access procedure in which a random access preamble and a payload are transmitted by the wireless communication device in a first step and a random access response is received by the wireless communication device in a second step occurring after the first step; or a contention-free random access procedure.

* * * * *